(12) United States Patent
Kawamata et al.

(10) Patent No.: US 9,242,612 B2
(45) Date of Patent: Jan. 26, 2016

(54) SHOCK ABSORBING MEMBER

(75) Inventors: Yasuji Kawamata, Oyama (JP); Satoshi Yamaguchi, Oyama (JP)

(73) Assignee: SHOWA DENKO K.K., Tokyo (JP)

( * ) Notice: Subject to any disclaimer, the term of this patent is extended or adjusted under 35 U.S.C. 154(b) by 62 days.

(21) Appl. No.: 14/238,880

(22) PCT Filed: Aug. 16, 2012

(86) PCT No.: PCT/JP2012/070790
§ 371 (c)(1),
(2), (4) Date: Jun. 6, 2014

(87) PCT Pub. No.: WO2013/024883
PCT Pub. Date: Feb. 21, 2013

(65) Prior Publication Data
US 2014/0292007 A1    Oct. 2, 2014

(30) Foreign Application Priority Data

Aug. 17, 2011 (JP) .................................. 2011-178432

(51) Int. Cl.
*F16F 7/12* (2006.01)
*B60R 19/34* (2006.01)
*B60R 19/18* (2006.01)

(52) U.S. Cl.
CPC ................. *B60R 19/34* (2013.01); *B60R 19/18* (2013.01); *F16F 7/12* (2013.01); *F16F 7/121* (2013.01)

(58) Field of Classification Search
CPC ......... B60R 19/34; B60R 19/18; F16F 7/121; F16F 7/12

USPC .................. 293/110, 122, 132, 133, 135; 296/187.03, 187.09; 188/377
See application file for complete search history.

(56) References Cited

U.S. PATENT DOCUMENTS 4,413,856 A * 11/1983 McMahan et al. ........ 296/187.03
6,258,465 B1 * 7/2001 Oka et al. ...................... 428/599
(Continued)

FOREIGN PATENT DOCUMENTS

EP    0 716 961 A1    6/1996
JP    07-035252 U    6/1995
(Continued)

OTHER PUBLICATIONS

Official Communication issued in corresponding European Patent Application No. 12823728.6, mailed on May 7, 2015.
(Continued)

*Primary Examiner* — Jason S Morrow
*Assistant Examiner* — E Turner Hicks
(74) *Attorney, Agent, or Firm* — Keating and Bennett, LLP

(57) ABSTRACT

A shock absorbing member includes an outer peripheral wall having a polygonal cross-sectional shape and including a plurality of side portions, and a plurality of ribs, on an inner side of the outer peripheral wall, radially extending from a central axis and connected to an intermediate position of each of the side portions. A boundary position of adjacent side portions on an outer peripheral surface of the outer peripheral wall is defined as a vertex, an intermediate position of each side portion on the outer peripheral surface of the outer peripheral wall is defined as a rib connection point, and portions segmenting each of the side portion into two, with the rib connection point as a boundary, are each defined as a half-side portion.

11 Claims, 40 Drawing Sheets

(56) References Cited

U.S. PATENT DOCUMENTS

| | | | |
|---|---|---|---|
| 6,871,890 B2 * | 3/2005 | Sato et al. | 293/155 |
| 2004/0201254 A1 * | 10/2004 | Liebhard et al. | 296/187.03 |
| 2005/0016807 A1 * | 1/2005 | Braymand | 188/371 |
| 2010/0126813 A1 * | 5/2010 | Hayashi | 188/377 |

FOREIGN PATENT DOCUMENTS

| | | | | |
|---|---|---|---|---|
| JP | 2001-124128 A | | 5/2001 | |
| JP | 2001-130442 A | | 5/2001 | |
| JP | 2001124128 A | * | 5/2001 | F16F 7/12 |
| JP | 2001130442 A | * | 5/2001 | B62D 21/15 |
| JP | 2009-184444 A | | 8/2009 | |
| JP | 2010-249236 A | | 11/2010 | |
| JP | 2010249236 A | * | 11/2010 | |
| JP | 2012-111356 A | | 6/2012 | |

OTHER PUBLICATIONS

Official Communication issued in International Patent Application No. PCT/JP2012/070790, mailed on Nov. 20, 2012.

* cited by examiner

Example 1 (R=1)

Example 2 (R=3)

Example3 (R=5)

Example4 (R=10)

Example5 (R=15)

Example6 (R=20)

Example 7 (tb=0.7)

Example 8 (tb=1.0)

Example9 (tb=1.25)

Comparative Example 1 (R=0)

Comparative Example 2 (R=30)

Comparative Example3 (tb=0.3)

Comparative Example4 (tb=0.5)

Comparative Example5 (tb=1.75)

Comparative Example6 (tb=2.0)

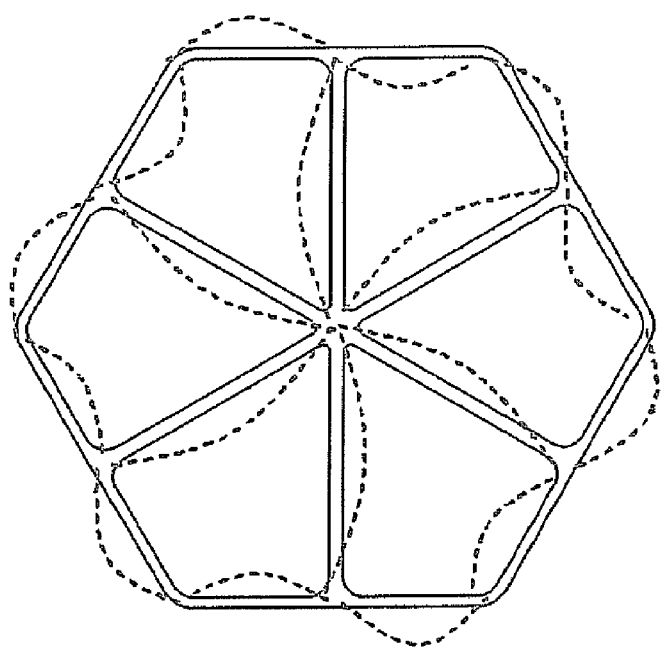
FIG. 7A
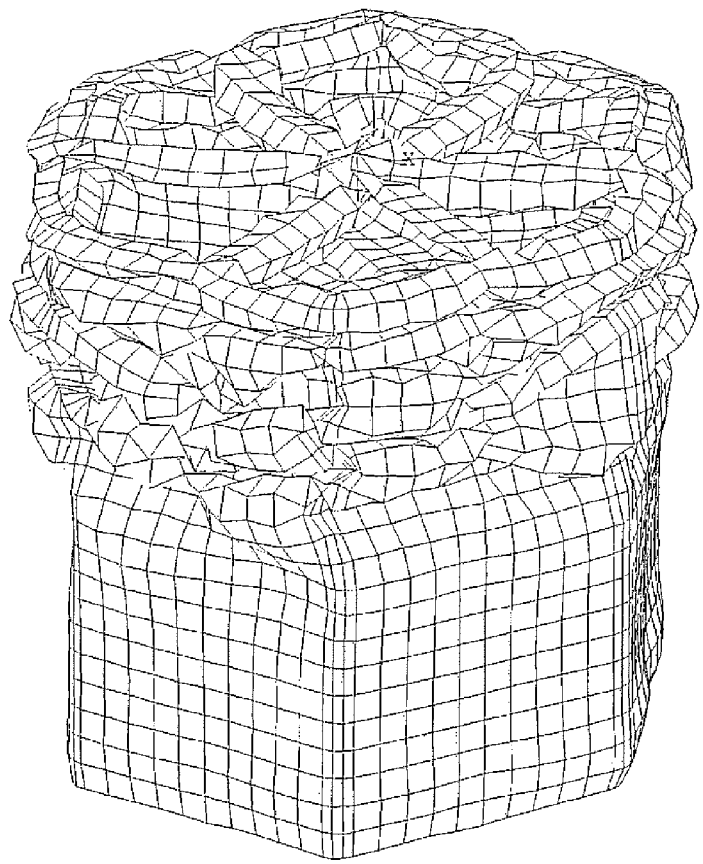
R/L=0.19 (R=5)  FIG. 7B

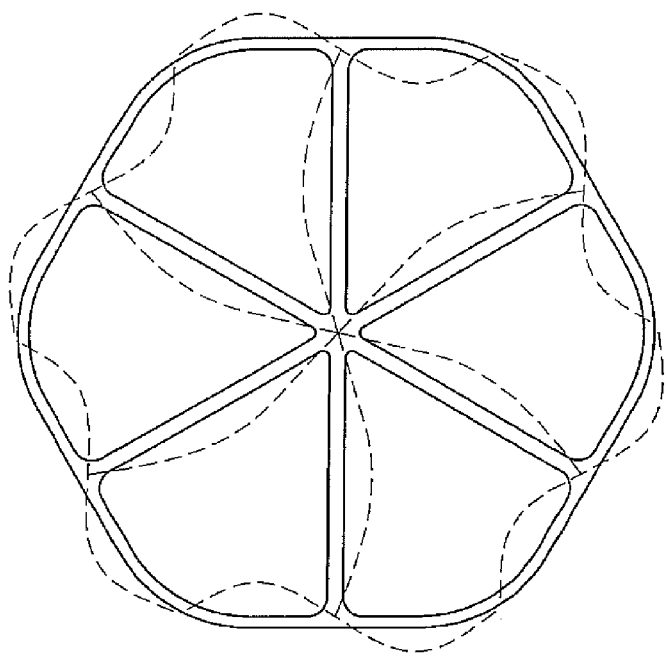
FIG. 8A
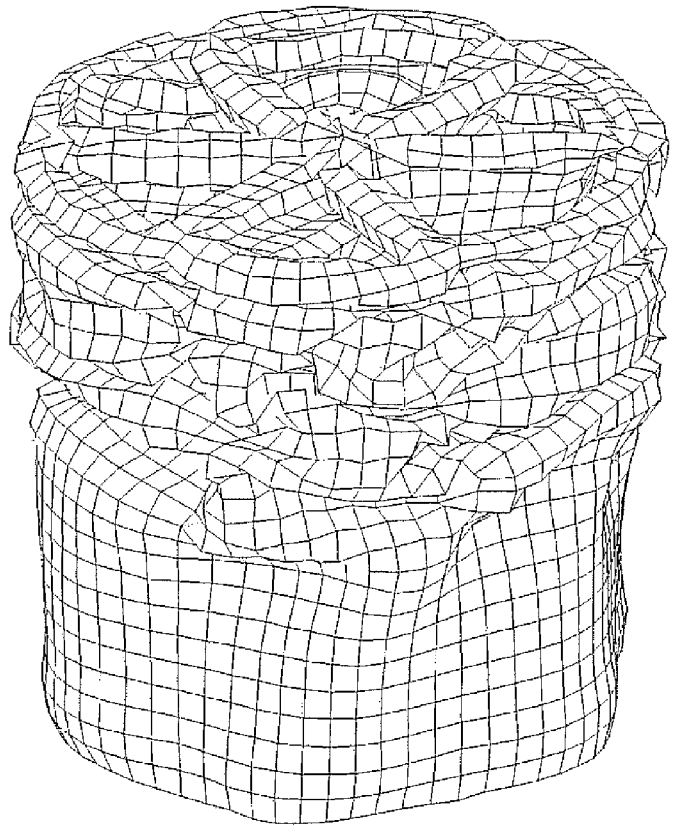
R/L=0.77 (R=20)  FIG. 8B tb/ta=0.35 (Outer peripheral wall thickness:0.7mm)

tb/ta=0.625 (Outer peripheral wall thickness: 1.25mm)

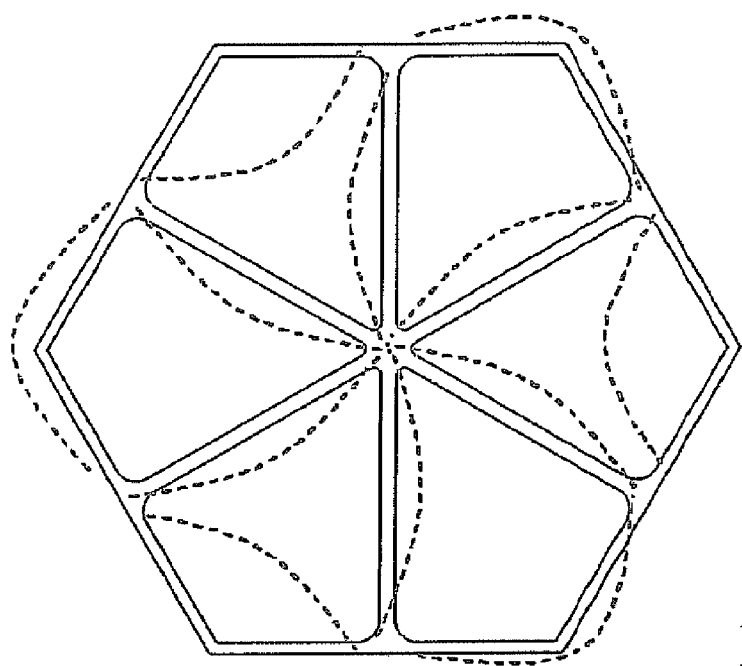
FIG. 11A
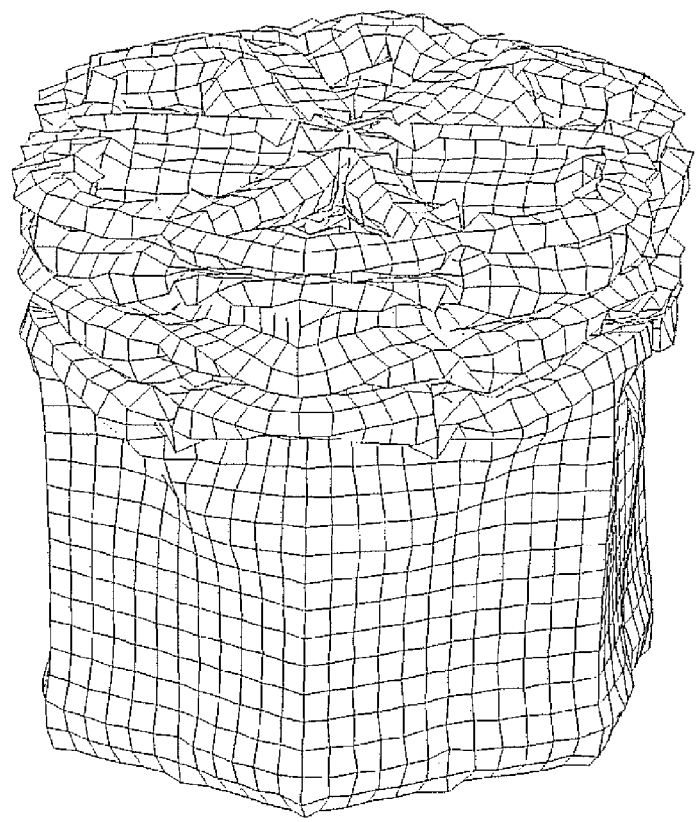
R/L=0 (R=0)  FIG. 11B

R/L=1.30 (R=30)

tb/ta=0.25 (Outer peripheral wall thickness：0.5mm)

tb/ta=1.0 (Outer peripheral wall thickness: 2.0mm)

SHOCK ABSORBING MEMBER

TECHNICAL FIELD

The present invention relates to a shock absorbing member to be used as a crash box, etc., for an automobile bumper beam, and its related technologies.

TECHNICAL BACKGROUND

A bumper beam for absorbing impact caused at the time of collision is provided on an inner side of a bumper to be provided at a front end of an automobile.

A bumper beam includes a bumper reinforcement to be arranged along a vehicle width direction and a pair of right and left crash boxes (shock absorbing members) which support the bumper reinforcement to a vehicle structure. At the time of collision, the crash box is compressively deformed in an axial direction thereof to thereby absorb the impact energy.

Such a crash box is constituted by a hollow aluminum extruded member, etc., and the outer peripheral wall is formed into a circular shape, a polygonal shape, etc. Further, to improve the absorbing characteristics of impact energy, a crash box in which a plurality of ribs are formed on an inside of the outer peripheral wall is proposed.

The crash box as shown in Patent Document 1, for example, includes an outer peripheral wall hexagonal in cross-section and 6 ribs radially extending from a central axis to an intermediate position of each side portion of the outer peripheral wall. When the crash box receives a compressive load, the crash box repeatedly deforms (buckling-deforms) in the axial direction in an accordion manner while deforming the portion of the outer peripheral wall sandwiched by adjacent nodes convexly and concavely in a radial direction, with the rib connection point and the vertex of the outer peripheral wall as a node and an anti-node, respectively.

PRIOR ART DOCUMENTS

Patent Document

Patent Document 1: Japanese Unexamined Laid-open Patent Application Publication No. 2010-249236

DISCLOSURE OF THE INVENTION

Problems to be Solved by the Invention

When evaluating the impact absorbing characteristics of a crash box, etc., a graph (load-displacement diagram) showing the relation between the load and the amount of displacement (stroke amount) when compressively deformed in an axial direction is often used. FIG. 19 is a schematic load-displacement diagram of a buckling-deform type shock absorbing member. In a shock absorbing member shown in such a load-displacement diagram, the impact absorbing characteristics are excellent when the fluctuation of the load is small regardless of the amount of displacement in the region after starting buckling deformation (the region surrounded by dotted lines in the figure). That is, it can be said that the impact absorbing characteristics are excellent when the amplitude at the time of buckling deformation is smaller.

In the meantime, in the shock absorbing member disclosed in Patent Document 1, in a cross-sectional view seen in a direction perpendicular to the axial direction, the portion arranged between nodes as rib connection points is to be deformed as a bending-deformation portion. These six bending-deformation portions are arranged side-by-side in a circumferential direction. When the number of these bending-deformation portions is small, the length of each bending-deformation portion becomes long in the circumferential direction, resulting in an increased amount of the convex-concave deformation of each bending-deformation portion at the time of the buckling-deformation. That is, the wavelength (buckling wavelength) during the buckling-deformation becomes long, increasing the amplitude of the load fluctuation, which in turn results in an increased fluctuation of the load with respect to the amount of displacement. In other words, if the number of bending-deformation portions is increased, the fluctuation of the load with respect to the amount of displacement can be decreased, which makes it possible to improve the impact absorbing characteristics.

However, in the conventional shock absorbing member, an increase in the number of bending-deformation portions causes complication of the structure, etc. That is, in the conventional shock absorbing member, the rib connection point of the outer peripheral wall connected to the rib functions as a node, and the portion of the outer peripheral wall between the adjacent nodes functions as a bending-deformation portion. Therefore, in order to increase the number of bending-deformation portions, it is required to increase the number of nodes, or the number of ribs. This, however, creates a problem of causing a complex structure and an increased weight.

The preferred embodiments of the present invention were made in view of the aforementioned and/or other problems in the related technologies. The preferred embodiments of the present invention can significantly improve upon the existing methods and/or devices.

The present invention was made in view of the aforementioned problems and aims to provide a shock absorbing member and its related technologies capable of improving impact absorbing characteristics while simplifying the structure thereof and making the weight lighter.

Other objects and advantages of the present invention will become apparent from the following preferred embodiments.

Means for Solving the Problems

To solve the aforementioned problems, the present invention has the following means.

[1] A shock absorbing member configured to absorb impact energy by being compressively deformed in an axial direction, comprising:

an outer peripheral wall having a polygonal shape in cross-section perpendicular to the axial direction and including a plurality of side portions; and a plurality of ribs, on an inner side of the outer peripheral wall, radially extending from a central axis and connected to an intermediate position of each of the side portions, wherein a boundary position of adjacent side portions on an outer peripheral surface of the outer peripheral wall is defined as a vertex, an intermediate position of each side portion on the outer peripheral surface of the outer peripheral wall is defined as a rib connection point, and portions segmenting each of the side portion into two, with the rib connection point as a boundary, are each defined as a half-side portion, and wherein, when being compressively deformed in the axial direction, the two adjacent half-side portions sandwiching the vertex buckling-deform repeatedly in the axial direction while being deformed convexly and concavely in different directions in a radial direction, with positions of the outer peripheral wall corresponding to the rib connection point and the vertex respectively as a node and an intermediate portion of each half-side portion as an anti-node.

[2] The shock absorbing member as recited in the aforementioned Item 1, wherein, when being buckling-deformed, in a cross-section perpendicular to the axial direction, a half-side portion deformed convexly in a radially outward direction and a half-side portion deformed concavely in a radially inward direction are arranged alternately along a circumferential direction.

[3] The shock absorbing member as recited in the aforementioned Item 1 or 2, wherein the vertex of the outer peripheral wall and vicinity thereof are constituted as an arc-shaped vertex arc portion having a curvature radius.

[4] The shock absorbing member as recited in the aforementioned Item 3, wherein it is adjusted so as to satisfy a relation of 0<R/L≤1.15, where an intersection point of virtual extended lines of both outer peripheral surface linear portions of the two adjacent half-side portions sandwiching the vertex is defined as a virtual vertex, a length from the virtual vertex to the rib connection point close to the virtual vertex is defined as a half-side portion length, the half-side portion length is "L," and a curvature radius of the outer peripheral surface of the vertex arc portion is "R."

[5] The shock absorbing member as recited in the aforementioned Item 3 or 4, wherein it is adjusted so as to satisfy a relation of M/M0=0.75 to 0.99, where an intersection point of virtual extended lines of both outer peripheral surface linear portions of the two adjacent half-side portions sandwiching the vertex is defined as a virtual vertex, a distance from the virtual vertex to a center of the shock absorbing member is "M0," and a shortest distance from the vertex to a virtual straight line connecting two rib connection points located on both sides of the vertex is "M."

[6] The shock absorbing member as recited in any one of the aforementioned Items 3 to 5, wherein it is adjusted so as to satisfy a relation of 0.35≤M/L<0.5, where an intersection point of virtual extended lines of both outer peripheral surface linear portions of the two adjacent half-side portions sandwiching the vertex is defined as a virtual vertex, a length of the half-side portion is "L", and a shortest distance from the vertex to a virtual straight line connecting two rib connection points located on both sides of the vertex is "M."

[7] The shock absorbing member as recited in any one of the aforementioned Items 1 to 6, wherein it is adjusted so as to satisfy a relation of 5.0<M×tb, where "M" is a shortest distance from the vertex to a virtual linear line connecting two rib connection points arranged on both sides of the vertex, and "tb" is a thickness of the outer peripheral wall.

[8] The shock absorbing member as recited in any one of the aforementioned Items 1 to 7, wherein a thickness of the outer peripheral wall is formed to have a thickness thinner than a thickness of the rib.

[9] The shock absorbing member as recited in the aforementioned Item 8, wherein it is adjusted so as to satisfy a relation of 0.25<tb/ta<0.875, where "ta" is a thickness of the rib, and "tb" is a thickness of the outer peripheral wall.

[10] The shock absorbing member as recited in any one of the aforementioned Items 1 to 9, wherein the outer peripheral wall is formed into a regular hexagonal shape in cross-section having six side portions.

[11] The shock absorbing member as recited in any one of the aforementioned Items 1 to 10, wherein the shock absorbing member is constituted by an aluminum or its alloy extruded member or drawn member.

[12] A shock absorbing member configured to absorb impact energy by being compressively deformed in an axial direction, comprising:

an outer peripheral wall having a polygonal shape in cross-section perpendicular to the axial direction and a plurality of side portions; and a plurality of ribs, on an inner side of the outer peripheral wall, radially extending from a central axis and connected to an intermediate position of each of the side portions, wherein a boundary position of adjacent side portions on an outer peripheral surface of the outer peripheral wall is defined as a vertex, an intermediate position of each side portion on the outer peripheral surface of the outer peripheral wall is defined as a rib connection point, and portions segmenting each side portion into two, with the rib connection point as a boundary, are each defined as a half-side portion, wherein, when being compressively deformed in the axial direction, the two adjacent half-side portions sandwiching the vertex buckling-deform repeatedly in the axial direction while being deformed convexly and concavely in a radial direction, with positions of the outer peripheral wall corresponding to the rib connection point and the vertex respectively as nodes and an intermediate portion of each half-side portion as an anti-node, wherein it is adjusted so that a maximum load at the time of being compressively deformed in the axial direction is 70 kN or more and that average load/maximum load is 0.85 or more.

[13] A vehicle crash box for supporting a bumper reinforcement to a vehicle structure, wherein the vehicle crash box is constituted by the shock absorbing member as recited in any one of the aforementioned Items 1 to 12 and configured to absorb impact energy to be applied to the bumper reinforcement.

[14] A bumper beam comprising:

a bumper reinforcement to be arranged in a vehicle width direction; and a crash box configured to support the bumper reinforcement to a vehicle structure, wherein the crash box is constituted by the shock absorbing member as recited in any one of the aforementioned Items 1 to 12 and configured to absorb impact energy to be applied to the bumper reinforcement by the crash box.

Effect of the Invention

According to the invention of the aforementioned Item [1], it is buckling-deformed with positions of the polygonal outer peripheral wall corresponding to the rib connection points and the vertex respectively as a node and an intermediate portion of the each half-side portion as an anti-node. Therefore, it is possible to cause a buckling-deformation every half-side portion, which makes it possible to reduce the amount of concave-convex deformation at the time of buckling deformation. Therefore, the load fluctuation with respect to the amount of displacement in the axial direction can be made small, which enables to obtain excellent impact absorbing characteristics.

According to the invention of the aforementioned Item [2], the shock absorbing member can absorb impact energy along the entire periphery in a well-balanced manner, thereby making it possible to obtain even better impact absorbing characteristics.

According to the invention of the aforementioned Items [3] to [11], the shock absorbing member can be deformed by a predetermined behavior more assuredly during buckling-deformation, and therefore, the aforementioned effects can be more assuredly obtained.

According to the shock absorbing member of the aforementioned Item [12], the aforementioned effects can be obtained more assuredly.

According to the invention of the aforementioned Item [13], a vehicle crash box exerting similar effects as described above can be obtained.

According to the invention of the aforementioned Item [14], a bumper beam exerting similar effects as above can be obtained.

BRIEF DESCRIPTION OF THE DRAWINGS

FIG. 7A is a cross-sectional view showing a sample model of Example 3.

FIG. 7B is a perspective view showing a deformed state of the sample model of FIG. 7A.

FIG. 8A is a cross-sectional view showing a sample model of Example 6.

FIG. 8B is a perspective view showing a deformed state of the sample model of FIG. 8A.

FIG. 11A is a cross-sectional view showing a sample model of Comparative Example 1.

FIG. 11B is a perspective view showing a deformed state of the sample model of FIG. 11A.

EMBODIMENTS FOR CARRYING OUT THE INVENTION

Figure 1:
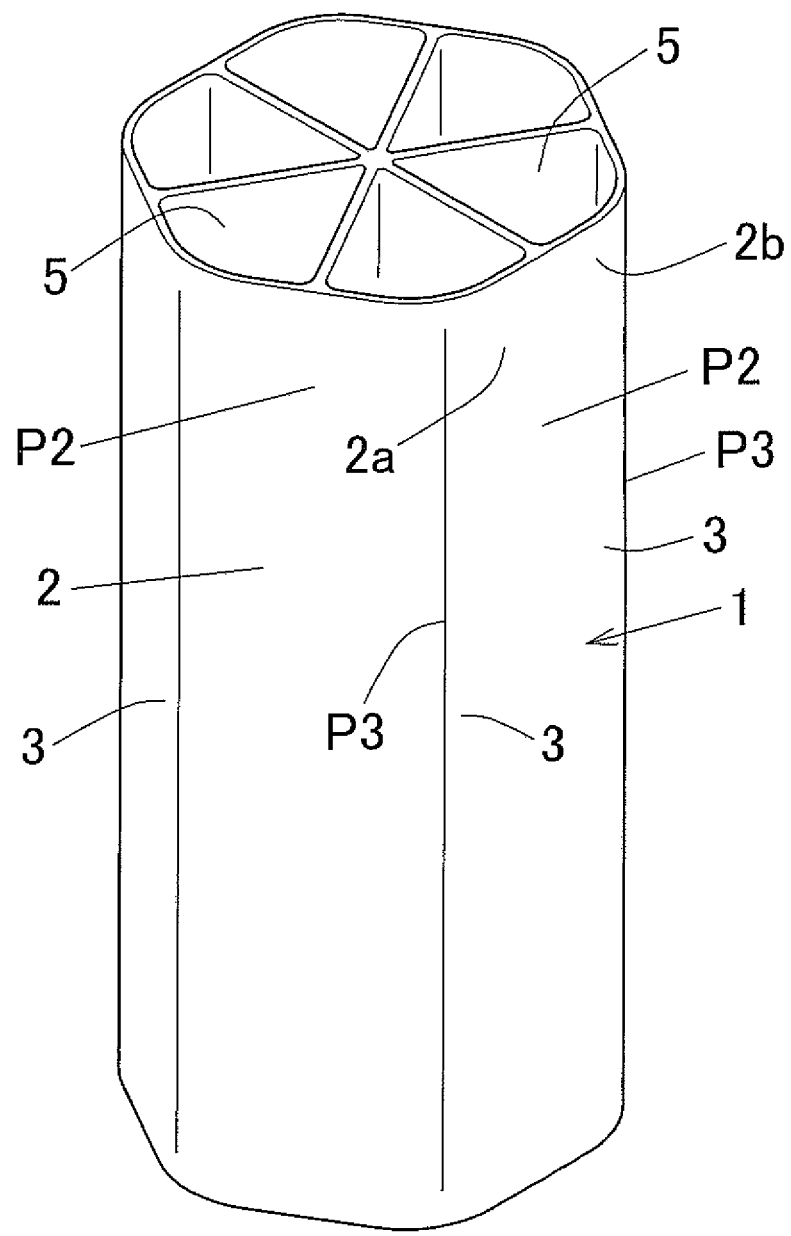
FIG. 1 is a perspective view showing a shock absorbing member of an embodiment of the present invention.
Figure 2A:
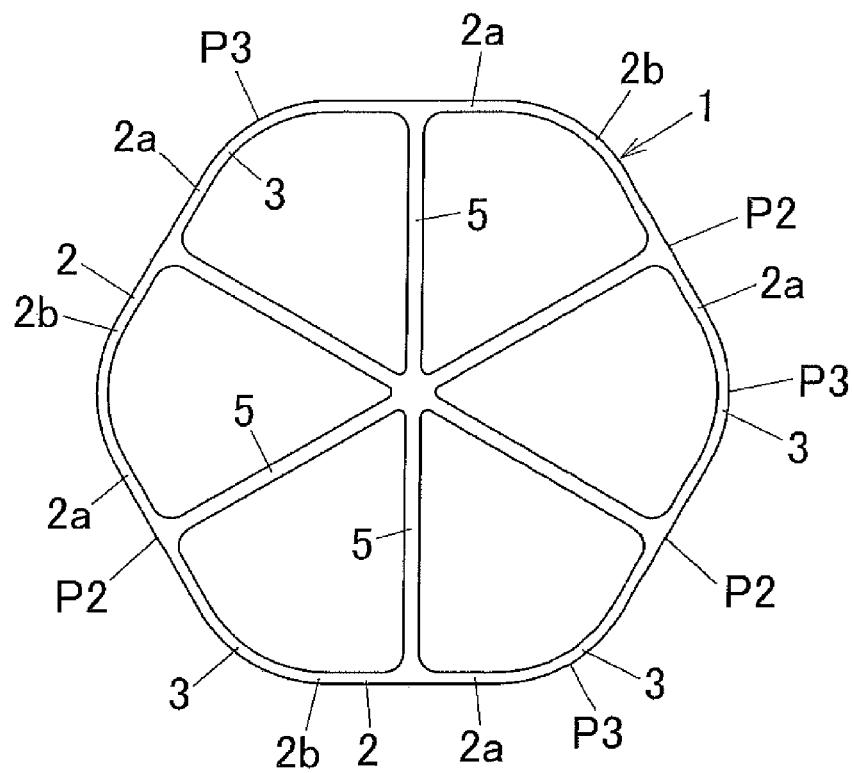
FIG. 2A is a cross-sectional view showing the shock absorbing member of the embodiment.
Figure 2B:
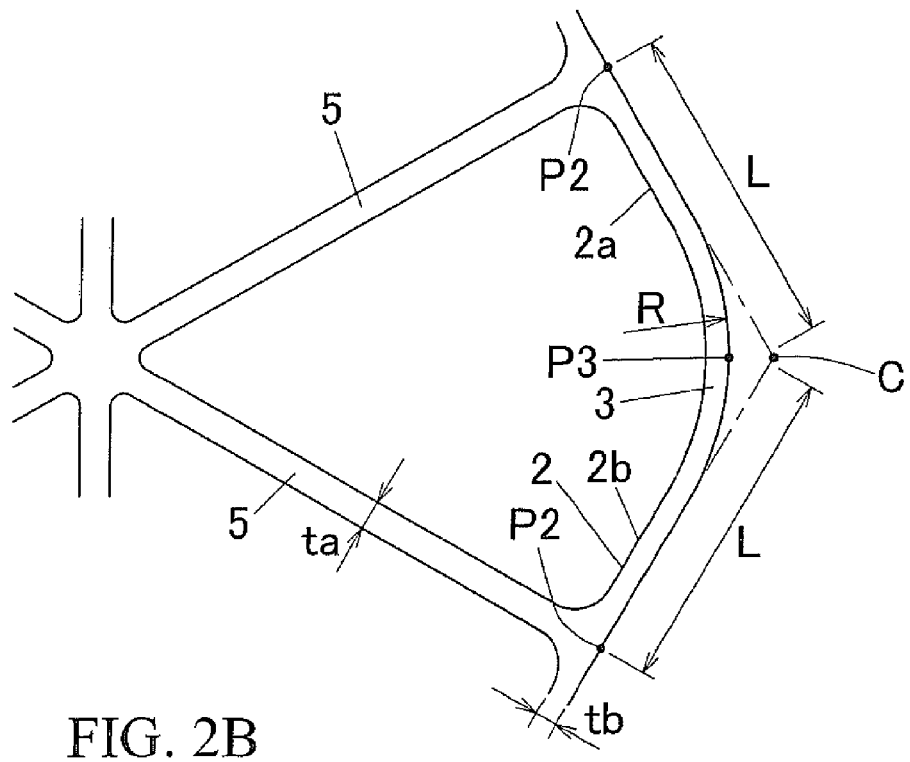
FIG. 2B is an enlarged cross-sectional view showing a portion of the shock absorbing member of the embodiment.

FIG. 1 is a perspective view showing a shock absorbing member which is an embodiment of the present invention. FIG. 2A is a cross-sectional view obtained by cutting the shock absorbing member with a plane perpendicular to the axial direction of the shock absorbing member. FIG. 2B is a partially enlarged cross-sectional view showing a portion of the shock absorbing member.

As shown in these figures, this shock absorbing member is provided with an outer peripheral wall 1 and ribs 5 arranged on an inner side of the outer peripheral wall 1.

In a state in which the outer peripheral wall 1 is cut with a plane perpendicular to the axial direction (cross-section perpendicular to the axial direction), the outer peripheral wall 1 is formed into a regular hexagonal shape having six side portions 2, and a vertex P3 is provided between side portions 2.

In this embodiment, the vertex P3 is arranged at a boundary position of adjacent side portions 2 on the outer peripheral surface of the outer peripheral wall 1.

The peripheral portion of the vertex P3 of the outer peripheral wall 1 is formed into an arc shape and the arc shaped portion is constituted as a vertex arc portion 3.

In this embodiment, the intermediate position of the outer peripheral surface of the vertex arc portion 3 in the circumferential direction coincides with the vertex P3.

The side portion 2 is constituted by the portion between the adjacent vertexes P3 and P3 on the outer peripheral wall 1. Therefore, in the side portion 2, portions close to the vertexes P3 and P3 at the ends are each constituted by a part (half) of the vertex arc portion 3 on both sides and each formed into an arc shape, and the remaining portions are each formed into a linear shape.

On the outer peripheral surface of the outer peripheral wall 1, a rib connection point P2 is provided at the intermediate position of each side portion 2, or the position segmenting each side portion 2 into two.

Six ribs 5 are provided corresponding to the six side portions 2 of the outer peripheral wall 1. Each rib 5 is formed so as to radially extend from the central axis to the rib connection point P2, and the ribs are arranged at equal intervals in the circumferential direction. The inner ends of the ribs 5 are integrally formed with each other at the central axis position of the shock absorbing member and the outer end of the rib 5 is integrally formed with the corresponding side portion 2.

In this embodiment, each side portion 2 is segmented into two half-side portions 2a and 2b on one side and the other side with the rib connection point P2 as a boundary. As it will be detailed later, each half-side portion 2a and 2b sandwiching the vertex P3 constitutes an individual bending-deformation portion and deforms radially in different directions at the time of impact energy absorption.

In the shock absorbing member of this embodiment, the outer peripheral wall 1 and the ribs 5 are continuously and respectively formed in the axial direction and are formed to have the same cross-sectional shape at any position in the axial direction.

The shock absorbing member of this embodiment is formed by a hollow extruded member, a drawn member, etc., made of, e.g., aluminum and its alloys as a material.

Figure 3A:
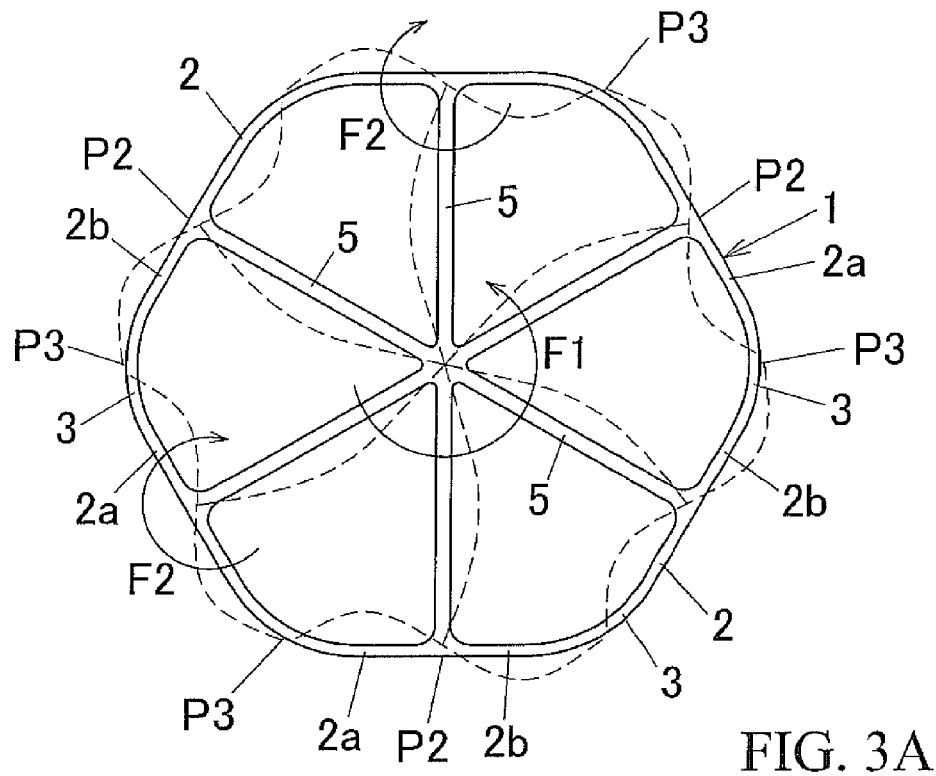
FIG. 3A is a cross-sectional view for explaining a deformed state of the shock absorbing member according to the present invention.

In the shock absorbing member of this embodiment, when being compressively deformed at the time of absorbing impact energy, as shown by the dotted lines in FIG. 3A, the shock absorbing member according to this embodiment is configured to repeatedly deform (buckling-deform) in the axial direction in an accordion manner while being deformed convexly or concavely in the radial direction, with the position of the outer peripheral wall corresponding to each rib connection point P2 and each vertex P3 as nodes respectively and each intermediate point (intermediate position) of each half-side portion 2a and 2b as an anti-node. In this way, each half-side portion 2a and 2b buckling-deforms as a bending-deformation portion. In other words, adjacent half-side portions 2a and 2b sandwiching the vertex P3 deform convexly and concavely in different directions in a radial direction. Specifically, it is configured to be buckling-deformed such that, when the half-side portion 2a on one side deforms convexly in the radially outward direction, the half-side portion 2b on the other side deforms concavely in the radially inward direction, and when the half-side portion 2a on one side deforms concavely in the radially inward direction, the half-side portion 2b on the other side buckling-deforms convexly in the radially outward direction.

Further, in this embodiment, in a cross-sectional view, it is configured to be buckling-deformed such that the half-side portion 2a (bending-deformation portion) deformed convexly in the radially outward direction and the half-side portion 2b (bending-deformation portion) deformed concavely in the radially inward direction are arranged alternately in the circumferential direction.

Also, all of the ribs 5 are deformed (buckling-deformed) repeatedly in an accordion manner in the axial direction so as to be bent in the same direction along the circumferential direction.

In the shock absorbing member of this embodiment, it is presumed that the mechanism of the motion at the time of impact absorption is as follows.

That is, as shown in FIG. 3A, when the shock absorbing member of this embodiment receives a compressing force in the axial direction at the time of collision, the ribs 5 are pushed down in one of circumferential directions, thereby exerting a force in one of rotational directions (circumferential directions) at the central portion, or a counterclockwise direction or a clockwise direction. Whether the direction will be counterclockwise or clockwise at the initial stage is undetermined and will be randomly selected.

Assuming that a counterclockwise force F1 acts on the central portion, each rib 5 deforms so as to bend, as shown by the dotted lines in FIG. 3A. Due to the deformation, a clockwise force F2 acts on each rib connection point P2 which is a connecting point of each rib 5 and the outer peripheral wall 1. Further, by this force F2, each half-side portion 2a adjacent to each rib connection point P2 in the clockwise direction deforms inwardly, and each half-side portion 2b adjacent to each rib connection point P2 in the counterclockwise direction deforms outwardly. As a result, in the shock absorbing member of this embodiment, the positions on the outer peripheral wall 1 corresponding to the rib connection point P2 and the vertex P3 function as a node respectively, and the intermediate portion of each half-side portion 2a and 2b functions as an anti-node. That is, the shock absorbing member of the present invention has a structure which transmits a rotational force from the central portion to the half-side portions 2a and 2b as described above. Therefore, the positions corresponding to the rib connection point P2 and the vertex P3 become nodes respectively and the intermediate portion of each half-side portion 2a and 2b becomes an anti-node.

Further, in the shock absorbing member according to the present invention, both end portions thereof in the axial direction are restrained. For example, they are fixed to another structural member. Therefore, the rotational direction is not limited to one direction between a clockwise direction and a counterclockwise direction, but the direction alternates between a clockwise direction and a counterclockwise direction for every displacement in the axial direction. However, the rotations do not always accurately alternate between a clockwise direction and a counterclockwise direction, but are alternated approximately as a whole.

Figure 3B:
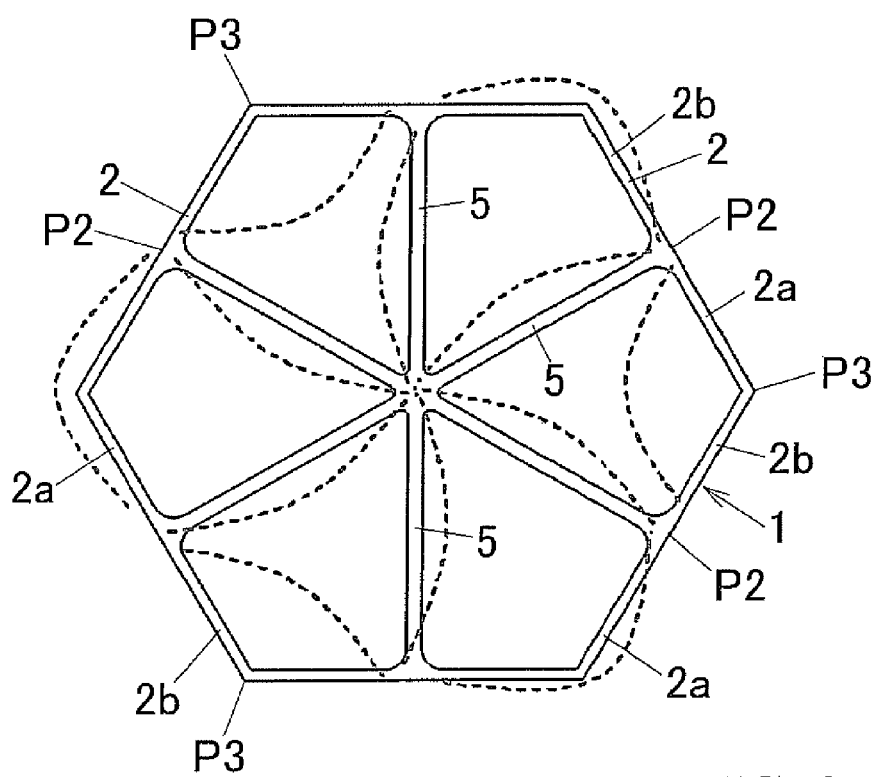
FIG. 3B is a cross-sectional view for explaining a deformed state of a conventional shock absorbing member.

On the other hand, in the conventional shock absorbing member shown in Patent Document 1, when compressively deformed at the time of impact energy absorption, as shown by the dotted lines in FIG. 3B, the shock absorbing member is deformed (buckling deformed) repeatedly in an accordion manner in the axial direction while two half-side portions 2a and 2b between the adjacent nodes P2 are deformed concavely or convexly in the radial direction, with the position on the outer peripheral wall 1 corresponding to each rib connection point P2 as a node and the vertex P3 as an anti-node. In other words, two adjacent half-side portions 2a and 2b sandwiching the vertex P3 function as a bending-deformation portion, and the two adjacent half-side portions 2a and 2b are buckling-deformed while being deformed convexly or concavely in the same radial direction.

As described above, in the shock absorbing member of this embodiment, it is configured such that each half-side portion 2a and 2b is buckling-deformed, with the positions on the outer peripheral wall 1 corresponding to the rib connection points P2 and the vertex P3 as nodes at the time of buckling deformation, and the intermediate point of the half-side portion 2a and 2b between the nodes P2 and P3 as an anti-node. Therefore, the length of each bending-deformation portion constituted by each side portion 2a and 2b becomes short, reducing the concave-convex deformation amount of the bending-deformation portion at the time of buckling deformation. Therefore, the load fluctuation (amplitude) with respect to the amount of displacement in the load-displacement diagram becomes small, which enables to obtain excellent impact absorbing characteristics.

Furthermore, in this embodiment, it is configured to be buckling-deformed such that the concave-convex directions of the adjacent half-side portions 2a and 2b are different and the concavely deformed portion and the convexly deformed portion are alternately arranged along the circumferential direction. Therefore, the impact energy can be absorbed evenly in a well-balanced manner along the entire circumference, which makes it possible to obtain even better impact absorbing characteristics.

In the shock absorbing member according to the present invention, when being compressively deformed in the axial direction, the concavely deformed portion and the convexly deformed portion of the half-side portions 2a and 2b are not required to be alternately arranged for the entire region of the circumferential direction. For example, provided that the concavely deformed portion and the convexly deformed portion are alternately arranged for 50% or more of the entire region in the circumferential direction in an arbitrary cross-sectional position of the shock absorbing member, which is within the scope of the present invention. In other words, in the present invention, in an arbitrary cross-sectional position of the shock absorbing member, it can be configured such that, in a partial region in the circumferential direction, the concavely deformed portion and the concavely deformed portion are arranged side by side, or that the convexly deformed portion and the convexly deformed portion are arranged side by side.

Further, in the shock absorbing member according to this embodiment, the rib 5 as an inner wall (reinforcement wall) makes a position corresponding to an unconnected vertex P3 function as a node, and the number of ribs 5 do not increase. Therefore, the structural complication and/or the weight increase due to the increase in the number of ribs can be prevented, which makes it possible to simplify the structure and attain the weight saving.

In the shock absorbing member of this embodiment, it is preferable that the specifics of each portion are constituted in the following manner.

As shown in FIG. 2B, an intersection point of virtual extended lines (straight lines) extending along the outer peripheral surface linear portions of the two adjacent half-side portions 2a and 2b sandwiching the vertex P3 is defined as a virtual vertex C, and the length L and L from the virtual vertex C to the rib connection point P2 and P2 on both sides of (close to) the virtual vertex C are defined as a half-side portion length.

Further, when the curvature radius of the outer peripheral surface of the vertex arc portion 3 of the outer peripheral wall 1 is defined as "R", it is preferable to satisfy a relation of "0<R/L≤1.15", more preferably "0<R/L≤0.77", and even more preferably "0.05≤R/L≤0.25." That is, when the value of R/L is too large or too small, the motion at the time of buckling deformation cannot be accurately controlled, which may make it difficult to cause buckling deformation with the aforementioned desired motions. For example, when the R/L is too small, the vertex P3 does not function as a node at the time of buckling deformation, and both half-side portions 2a and 2b sandwiching the vertex P3 are deformed concavely or convexly in the same direction as one bending-deformation portion (see FIG. 3B), thereby making it difficult to obtain desired impact absorbing characteristics.

In this embodiment, it is preferable that a relation of "0.25<tb/ta<0.875" is satisfied, where the thickness of the rib 5 is "ta" and the thickness of the outer peripheral wall 1 is "tb". That is, when the value of "tb/ta" is too small and the thickness "tb" of the outer peripheral wall 1 is too small or too large with respect to the thickness "ta" of the rib 5, the motion at the time of buckling deformation cannot be accurately controlled, which may make it difficult to perform buckling deformation with the aforementioned desired motions.

Figure 2C:
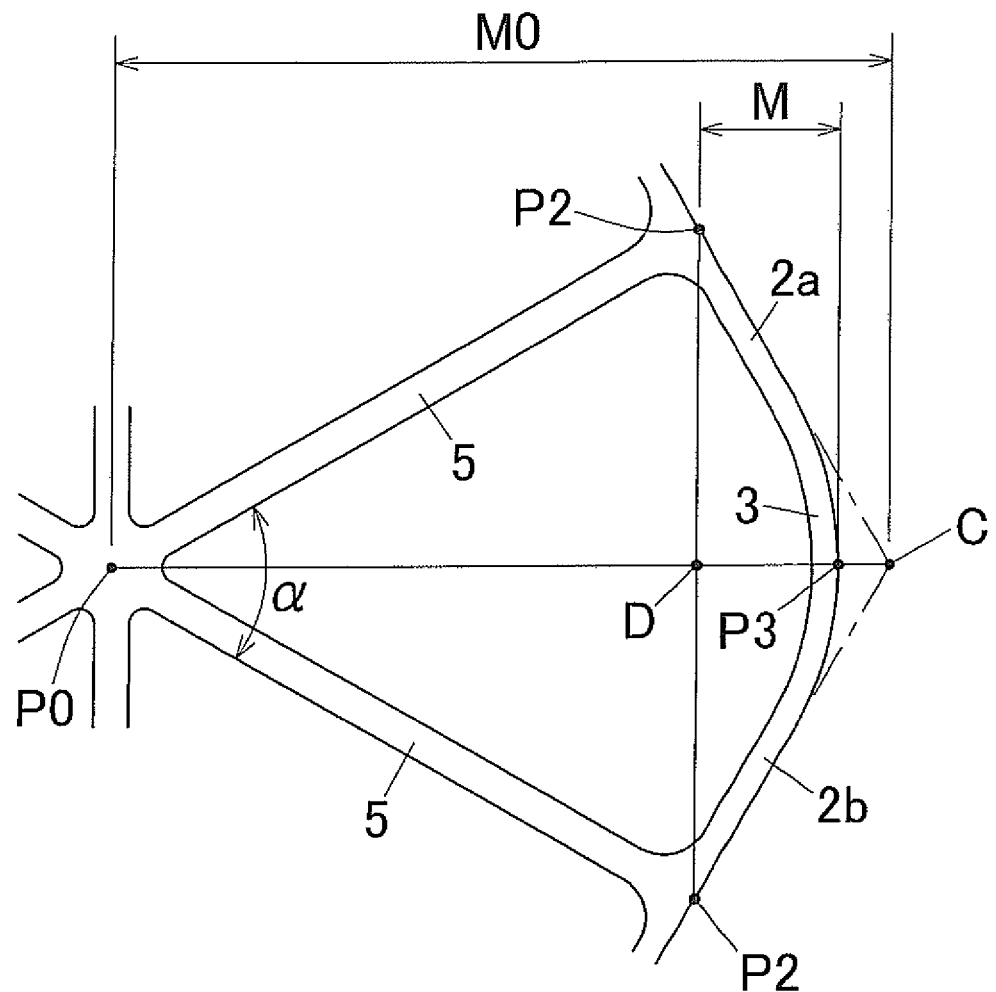
FIG. 2C is an enlarged cross-sectional view showing a portion of the shock absorbing member of the embodiment.

As shown in FIG. 2C, in this embodiment, the distance "M0" from the center P0 to the virtual vertex C is defined as a virtual radius. Furthermore, the distance "M" from the intersection "D" of the straight line P0-C connecting the center "P0" and the virtual vertex "C" and a virtual straight line P2-P2 connecting adjacent rib connection points P2 and P2 is defined as a vertex protrusion amount. In other words, the shortest distance "M" from the vertex P3 to the virtual straight line P2-P2 connecting the rib connection points P2 and P2 on both sides of the vertex P3 is defined as the vertex protrusion amount.

At this time, in the shock absorbing member of this embodiment, it is preferable that a relation of "M/M0=0.75 to 0.99" is satisfied. That is, in the shock absorbing member of this embodiment, when the value of "M/M0" is adjusted so as to fall within the aforementioned specific range and a compressing force in the axial direction is applied, it becomes easier to transmit the rotational force from the rib connection point P2 to the vertex P3. Therefore, buckling deformation can be performed with the desired motions and excellent impact absorbing characteristics can be obtained.

In the shock absorbing member of this embodiment, the peripheral portion including the vertex P3 is constituted by the vertex arc portion 3 having a constant curvature radius. However, in the present invention, the structure of the peripheral portion of the vertex P3 is not limited to that. For example, the peripheral portion of the vertex P3 can be a composite arc portion having a plurality of curvature radii, a polygonal portion including a plurality of straight line portions, and a portion combined with an arc portion and a straight line portion.

In the present invention, the intermediate position of the side portion 2 is different from an intermediate point accurately segmenting the side portion 2 into two, but is a region having a predetermined width including the intermediate point. In other words, in the present invention, the vertex P3 can be arranged at any position as long as the desired deformation movement is performed at the time of impact absorption. For example, the vertex P3 is not limited to be located at an intermediate point between adjacent rib connection points P2 and P2, but can be at a position displaced from the intermediate point.

Also, in the shock absorbing member of this embodiment, it is preferable to satisfy a relation of "0.35≤M/L<0.5". That is, when the aforementioned relation is satisfied, it becomes easier for the rotational force from the rib connection point P2 to the vertex P3 to be transmitted in the same manner as mentioned above, and excellent impact absorbing characteristics can be obtained.

In the shock absorbing member of this embodiment, it is preferable to satisfy a relation of "5.0<M×tb", more preferably "7.0≤M×tb". That is, in the shock absorbing member of this embodiment, when satisfying the relation, the maximum load at the time of absorbing collision energy can be secured largely, and excellent impact absorbing characteristics can be obtained.

Further, in the shock absorbing member of this embodiment, it is preferable to satisfy a relation of "[(γ×M)/α]×100=β×L", when the angle between adjacent ribs 5 and 5 is "α (see FIG. 2C)", β=0.8 to 0.9 (preferably, β=0.81 to 0.86), and γ=1.01 to 1.33. That is, when this relation is satisfied, excellent impact absorbing characteristics can be obtained regardless of the angle α. For example, when the aforementioned relation is satisfied, excellent impact absorbing characteristics can be obtained for all shock absorbing members, from a regular decagonal shock absorbing member having an angle α of 36° and a shock absorbing member having a pentagonal cross-section having an angle α of 72°.

The following Examples will make it apparent that, when each of the relations "0<R/L≤1.15", "0.25<tb/ta<0.875", "M/M0=0.75 to 0.99", "0.35≤M/L<0.5", and "5.0<M×tb" is satisfied, the motions at the time of buckling deformation can be controlled appropriately.

In this embodiment, it is preferable that the curvature radius R is set to 1 mm to 40 mm. Further, it is preferable that the half-side portion length L is set to 15 mm to 52 mm.

Also, it is preferable that the thickness tb of the outer peripheral wall 1 is set to 0.5 mm to 5 mm. It is preferable that the thickness ta of the rib 5 is set to 1 mm to 6 mm.

That is, when the values of R, L, ta, and tb deviate from the aforementioned predetermined ranges, the motions at the time of buckling deformation cannot be accurately controlled, which may make it difficult to perform buckling deformation by the desired motions.

Figure 4:
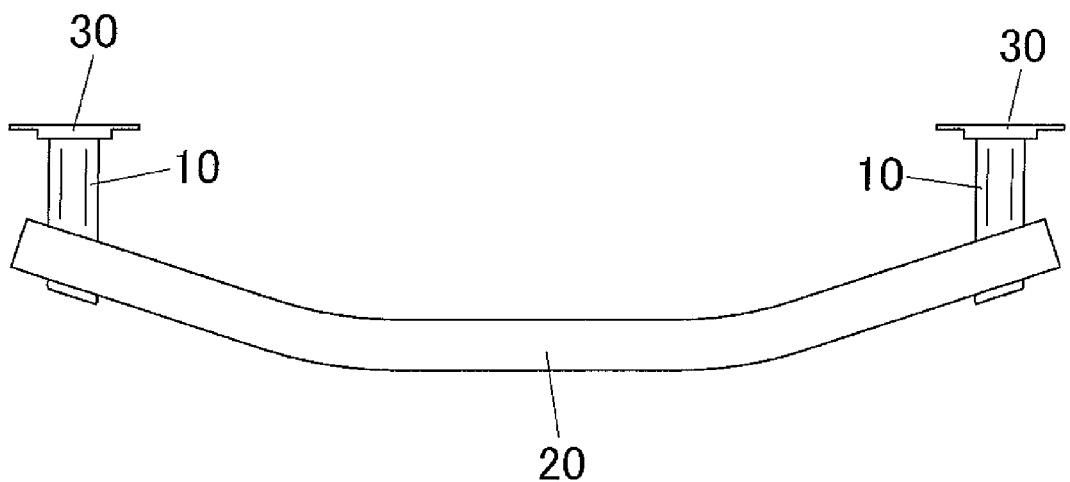
FIG. 4 is a plan view showing a vehicle bumper beam to which the shock absorbing member of the embodiment is applied.
Figure 5A:
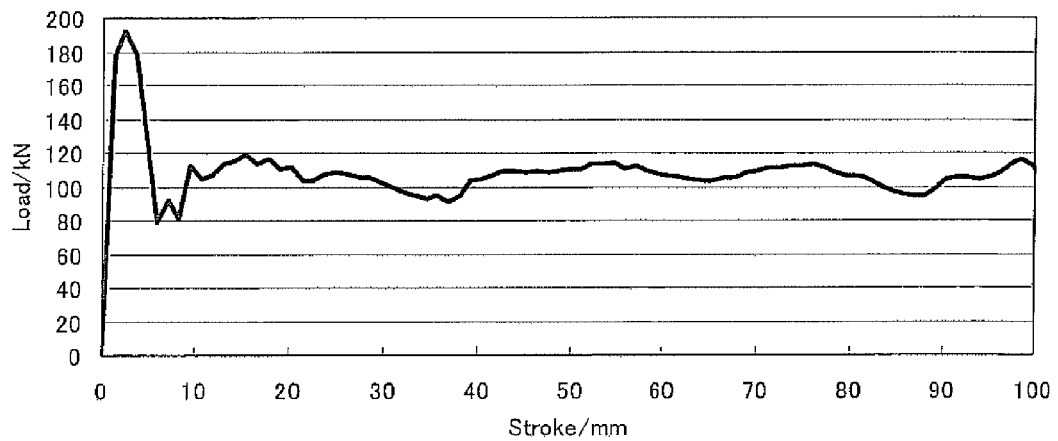
FIG. 5A is a load-displacement diagram of Example 1 of the present invention.
Figure 5B:
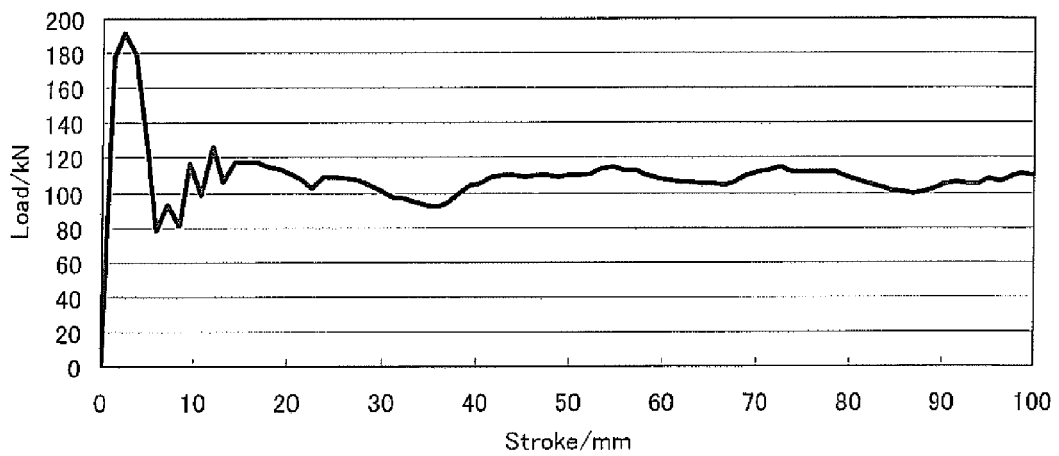
FIG. 5B is a load-displacement diagram of Example 2 of the present invention.
Figure 5C:
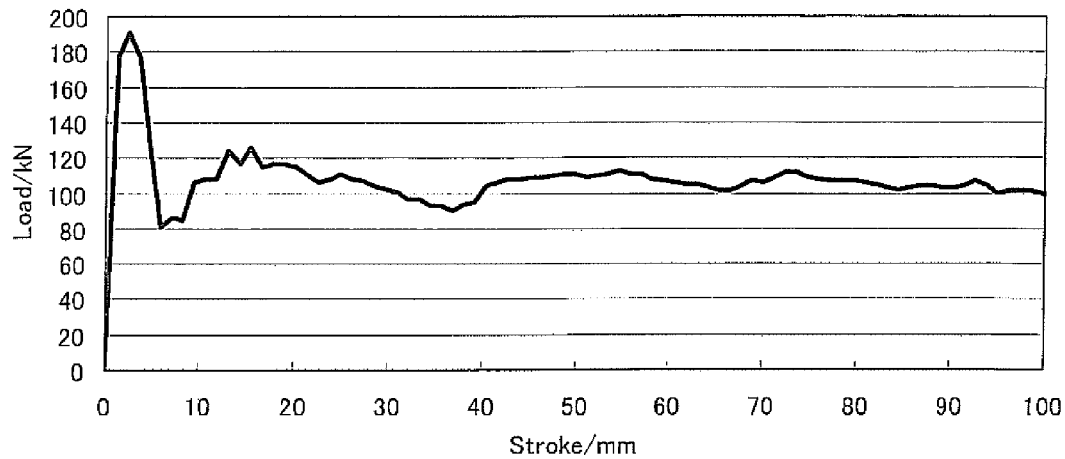
FIG. 5C is a load-displacement diagram of Example 3 of the present invention.
Figure 5D:
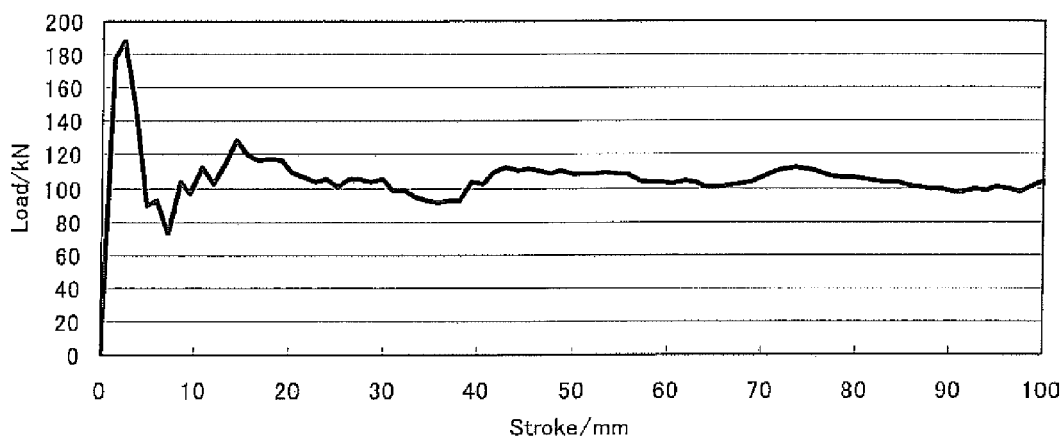
FIG. 5D is a load-displacement diagram of Example 4 of the present invention.
Figure 5E:
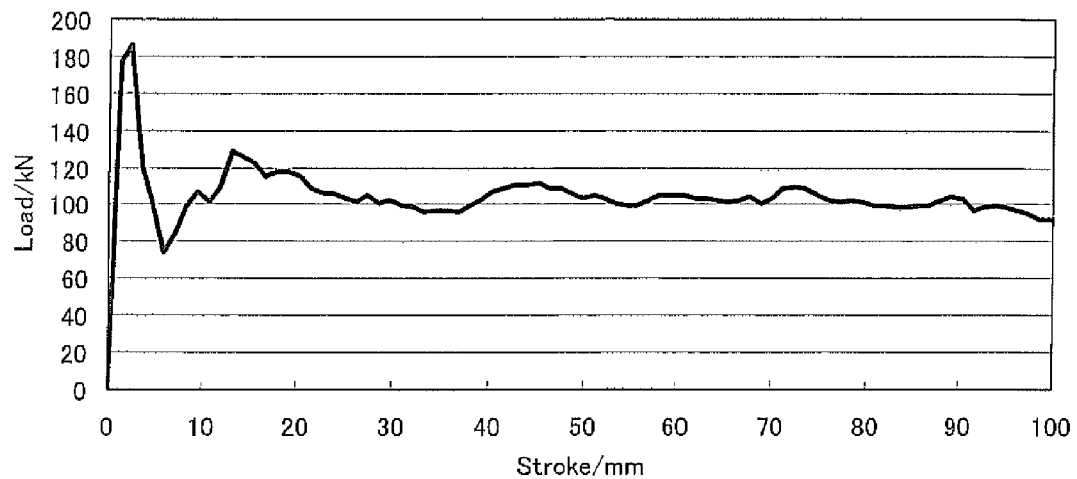
FIG. 5E is a load-displacement diagram of Example 5 of the present invention.
Figure 5F:
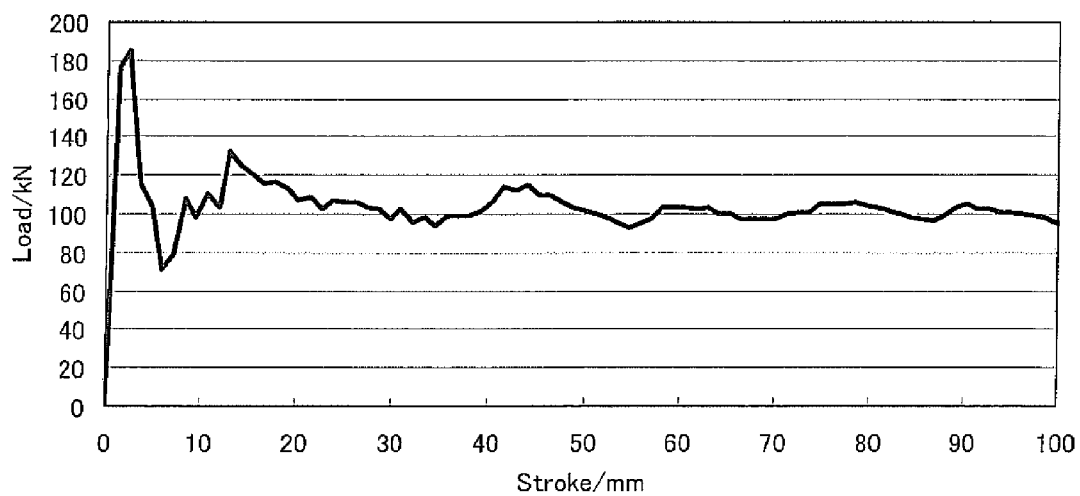
FIG. 5F is a load-displacement diagram of Example 6 of the present invention.
Figure 5G:
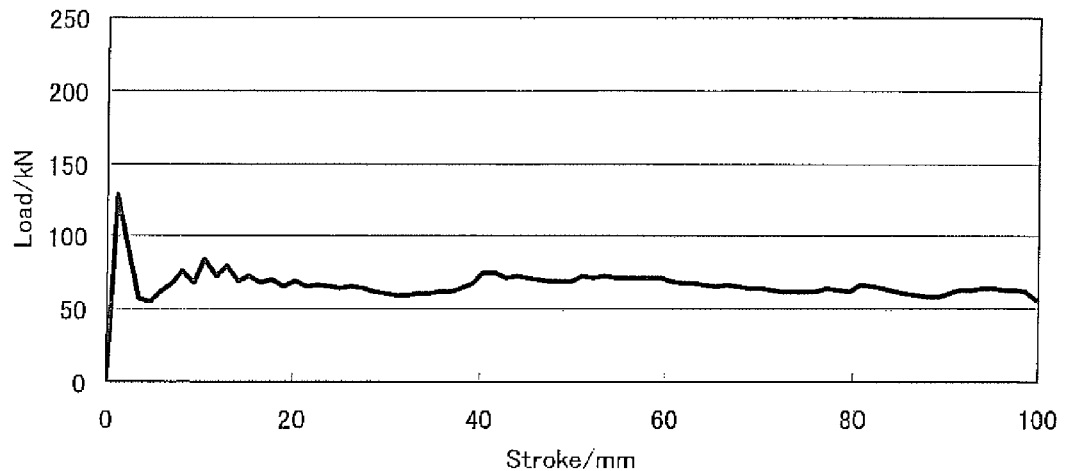
FIG. 5G is a load-displacement diagram of Example 7 of the present invention.
Figure 5H:
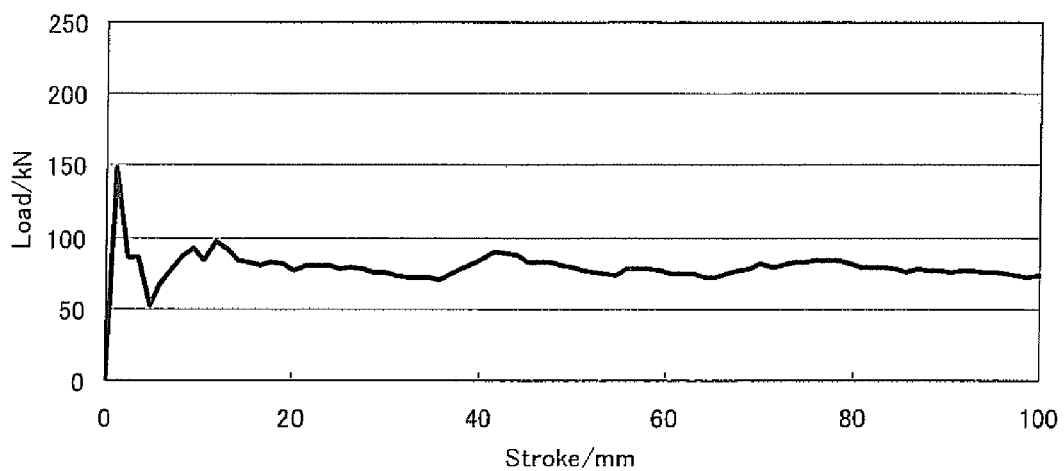
FIG. 5H is a load-displacement diagram of Example 8 of the present invention.
Figure 5I:
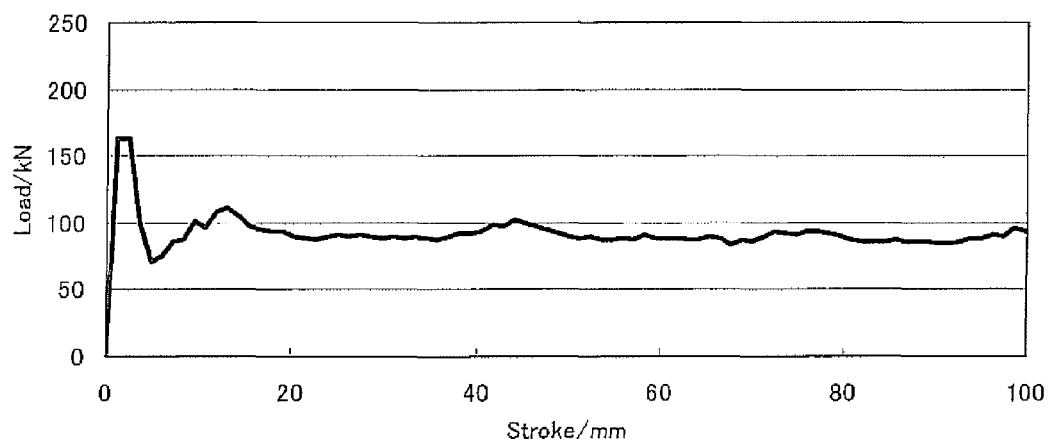
FIG. 5I is a load-displacement diagram of Example 9 of the present invention.
Figure 6A:
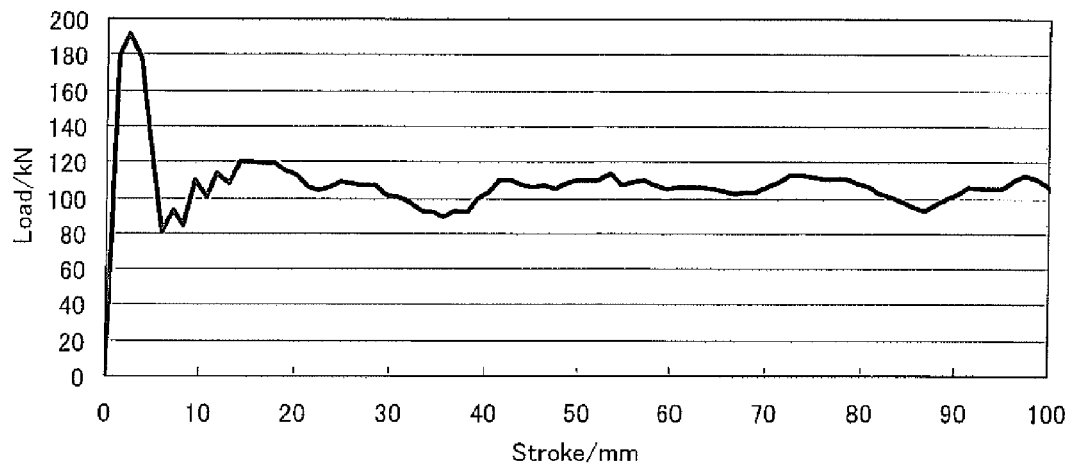
FIG. 6A is a load-displacement diagram of Comparative Example 1.
Figure 6B:
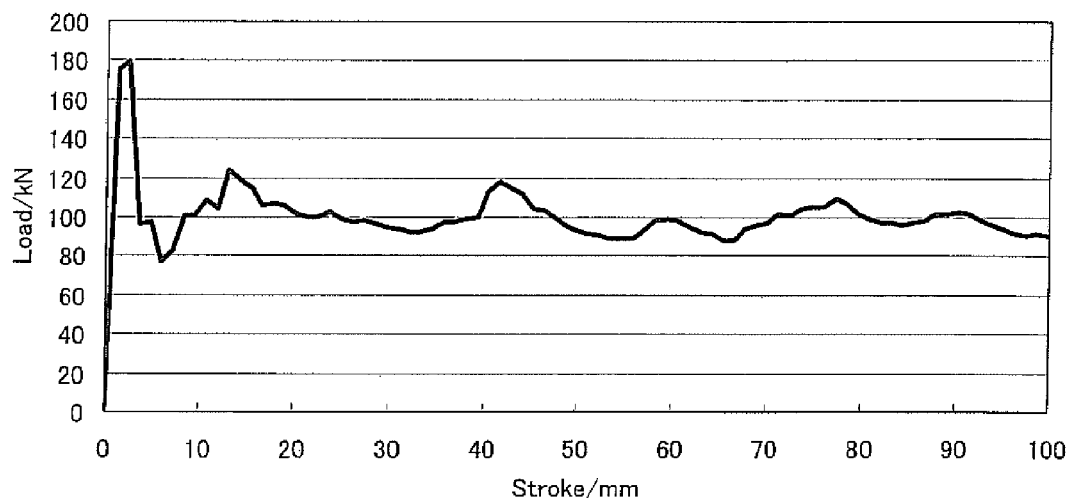
FIG. 6B is a load-displacement diagram of Comparative Example 2.
Figure 6C:
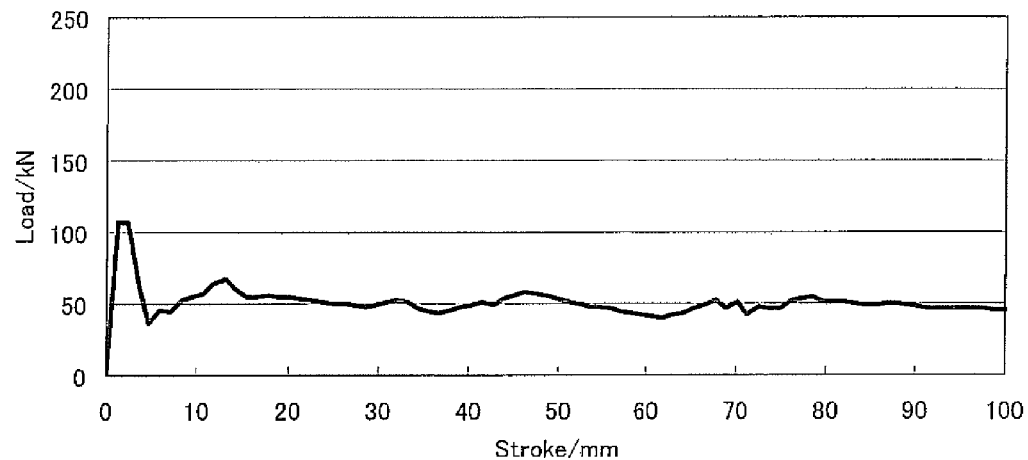
FIG. 6C is a load-displacement diagram of Comparative Example 3.
Figure 6D:
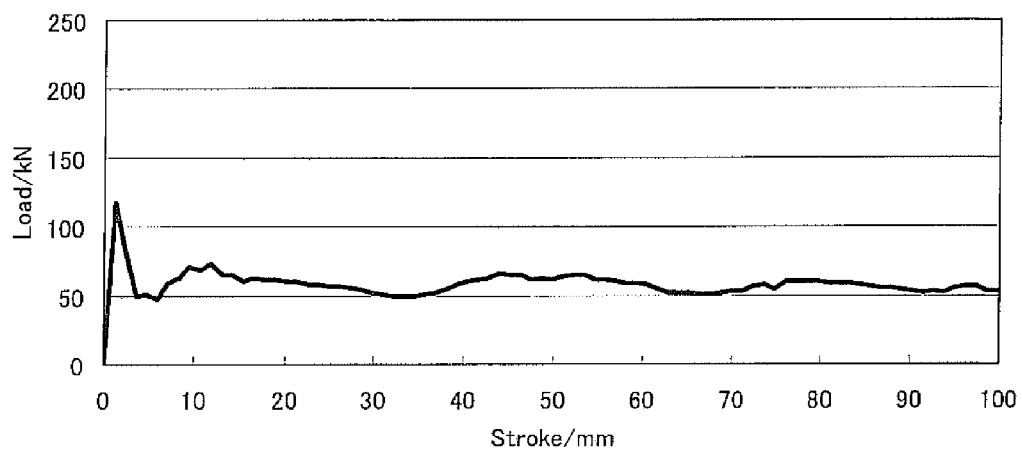
FIG. 6D is a load-displacement diagram of Comparative Example 4.
Figure 6E:
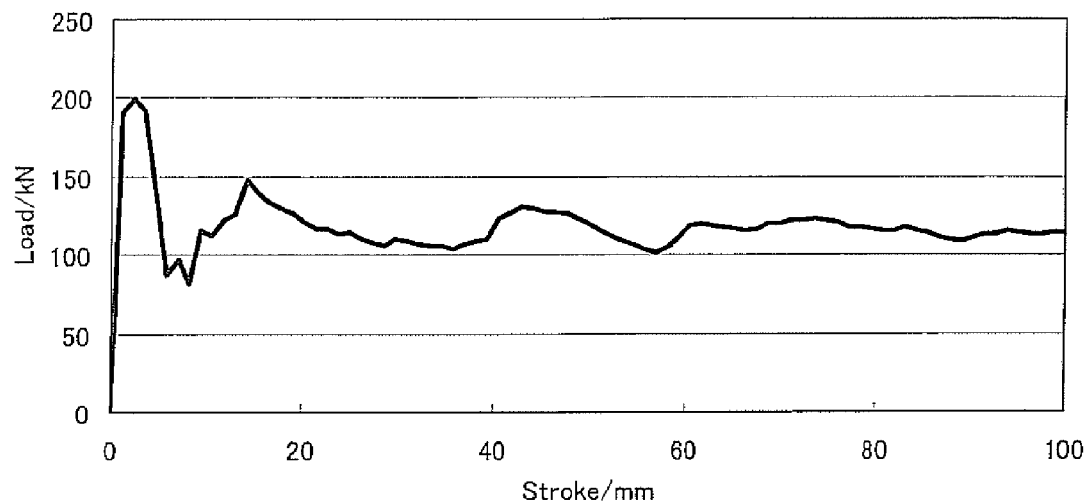
FIG. 6E is a load-displacement diagram of Comparative Example 5.
Figure 6F:
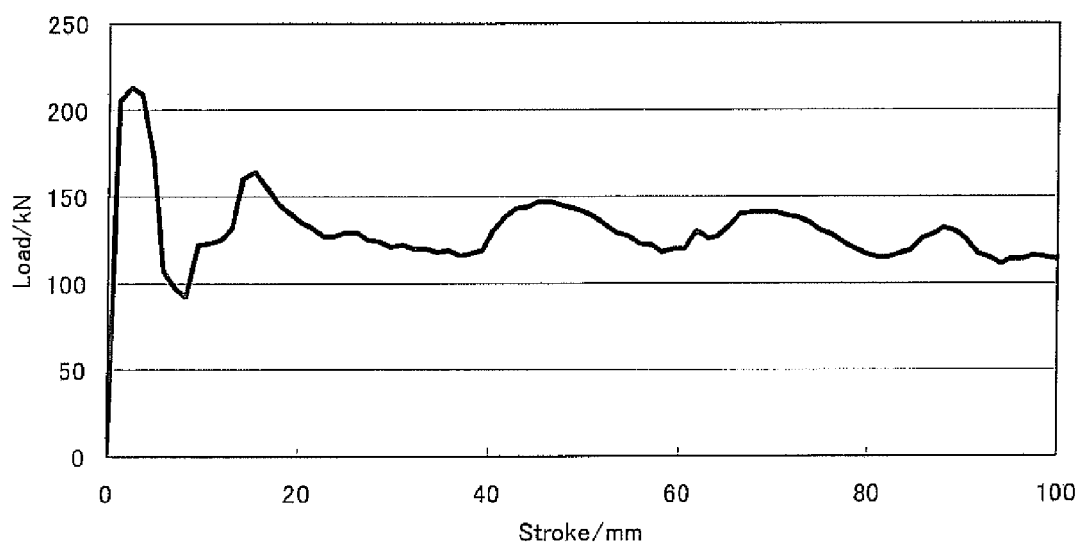
FIG. 6F is a load-displacement diagram of Comparative Example 6.

Furthermore, the shock absorbing member of the present invention can be suitably used as a vehicle shock absorbing member. For example, it can be suitably used for an automobile bumper beam as shown in FIG. 4. The bumper beam includes a bumper reinforcement 20 to be arranged in a vehicle width direction at the front end or the rear end of an automobile and crash boxes 10 and 10 having tip portions fixed to both end portions of the bumper reinforcement 20. The base end sides of the crash boxes 10 and 10 are to be fixed to a vehicle structure via bumper stays 30. The crash box 10 of the bumper beam is constituted by the shock absorbing member of the present invention.

In the present invention, as a method of fixing the crash box as a shock absorbing member to the bumper reinforcement, there is a method using a diameter expansion technology as described below, for example.

Figure 17A:
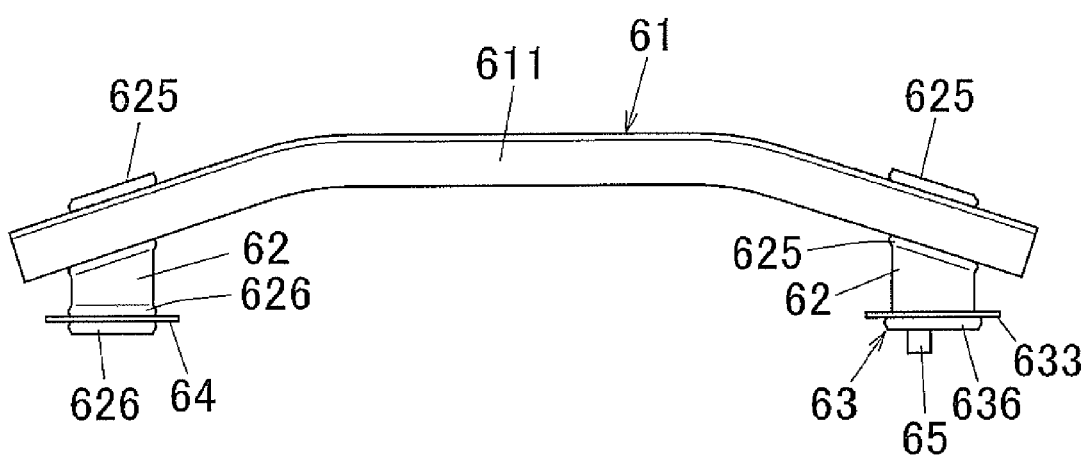
FIG. 17A is a plan view showing a vehicle bumper beam of a first practical example using the shock absorbing member of the present invention.
Figure 17B:
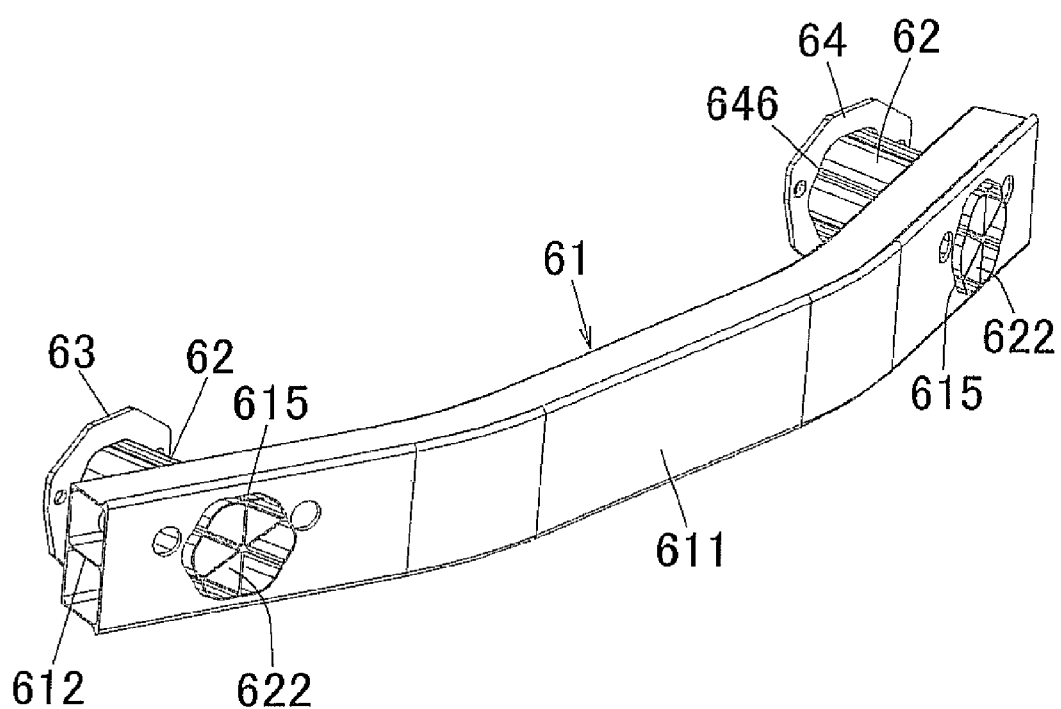
FIG. 17B is a schematic perspective view showing the bumper beam of the first practical example.
Figure 17C:
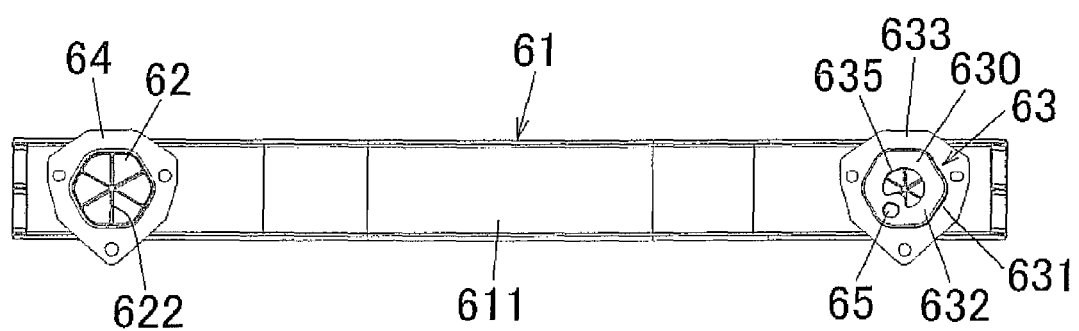
FIG. 17C is a rear view showing the bumper beam of the first practical example.
Figure 17D:
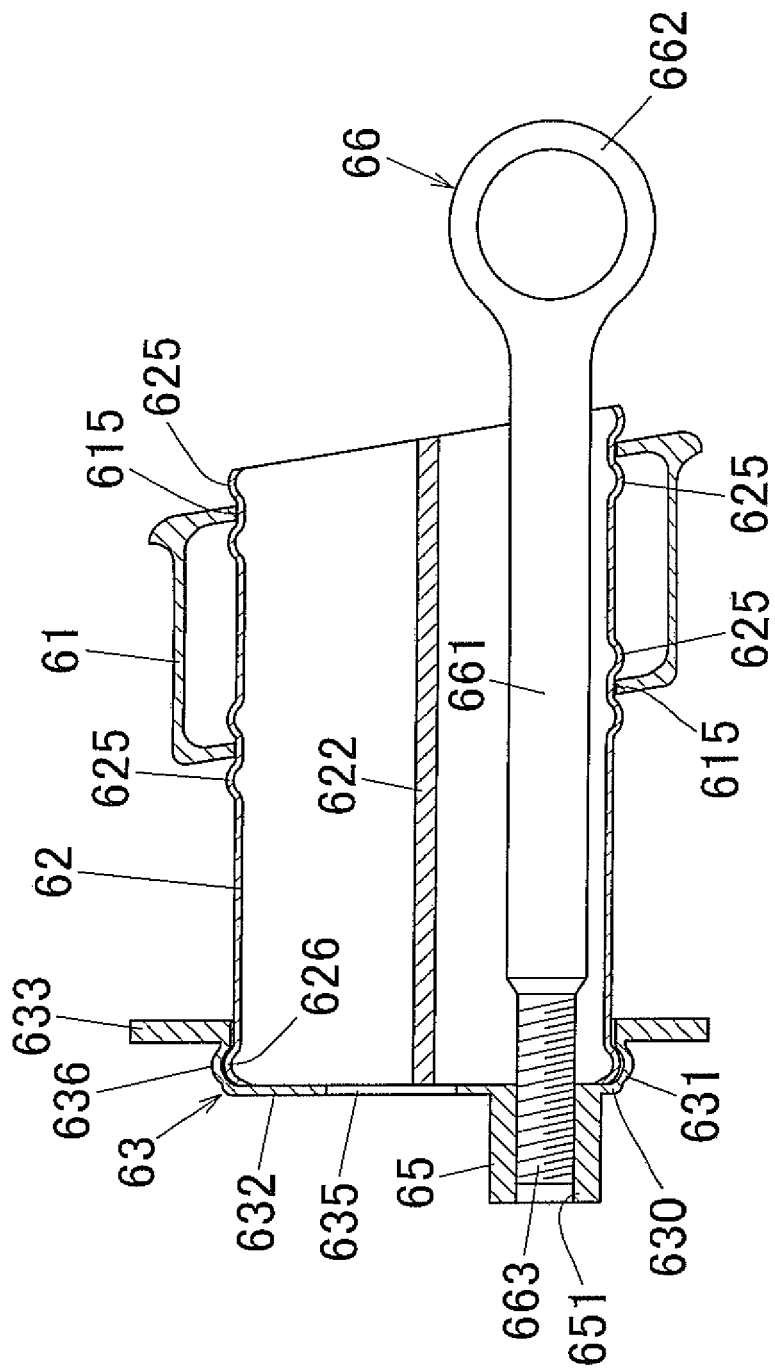
FIG. 17D is a side cross-sectional view showing the crash box and vicinity thereof located on one side of the bumper beam of the first practical example in a towing hook attached state.
Figure 17E:
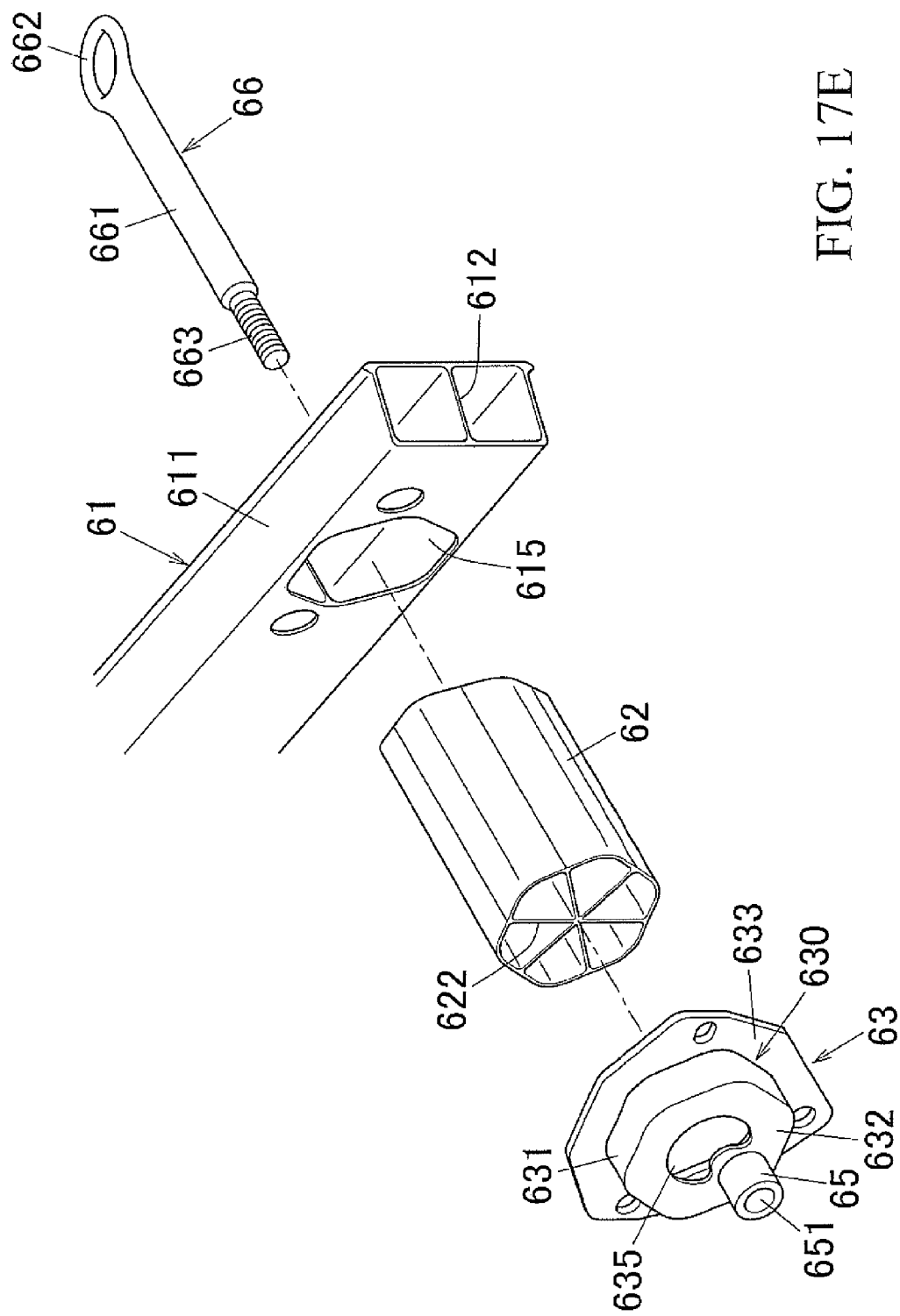
FIG. 17E is an exploded perspective view showing the crash box and vicinity thereof located on one side of the bumper beam of the first practical example in a state before executing a tube expansion process.
Figure 17F:
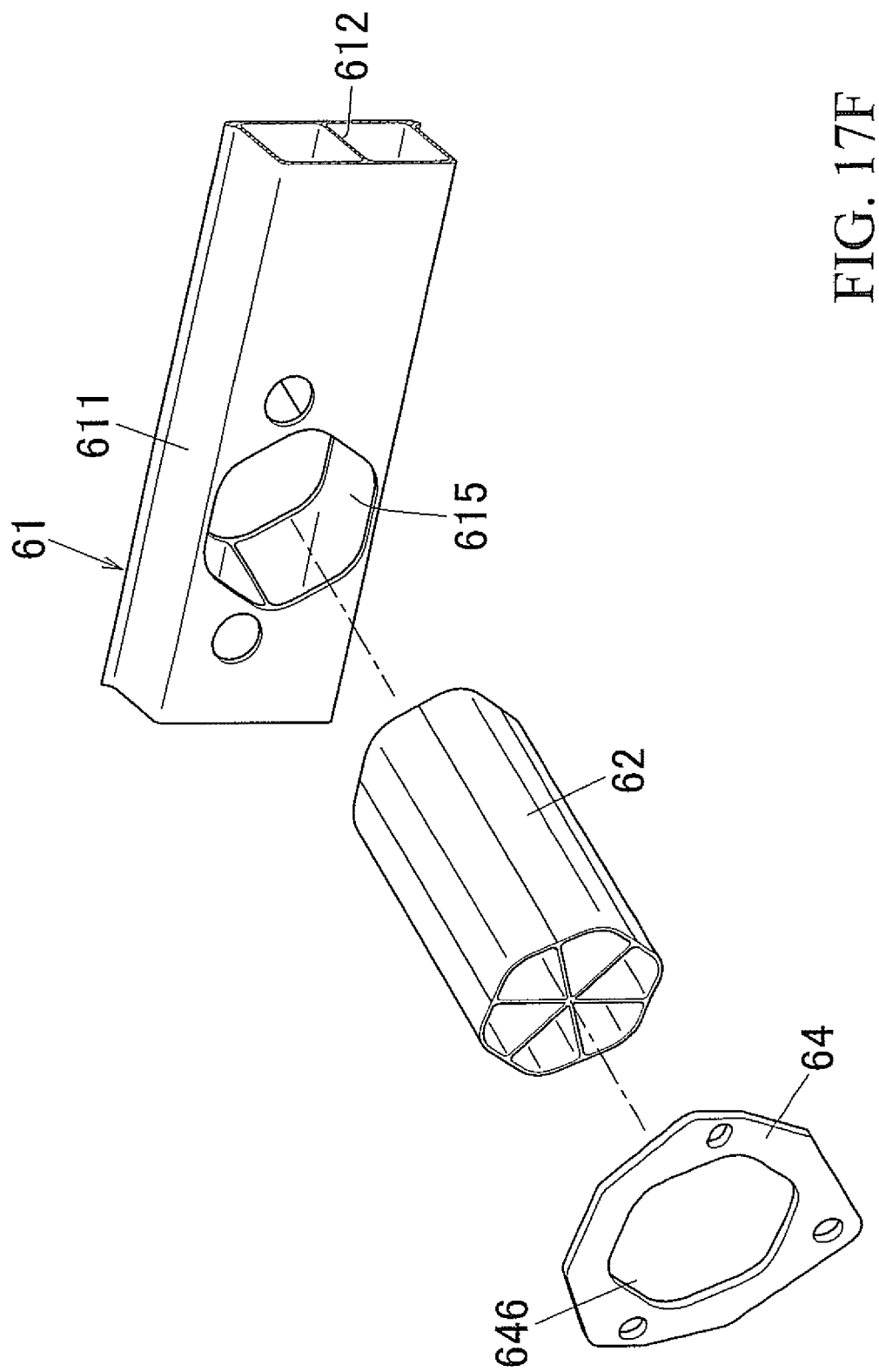
FIG. 17F is an exploded perspective view showing the crash box and vicinity thereof located at the other side of the bumper beam of the first practical example in a state before executing a tube expansion process.

FIG. 17A is a plan view showing a vehicle bumper beam of a first practical example of the present invention. FIG. 17B is a schematic perspective view thereof. FIG. 17C is a rear view thereof. FIG. 17D is a side cross-sectional view showing a crash box and vicinity thereof on one side of the bumper beam of the first practical example. FIG. 17E is an exploded perspective view showing the crash box and vicinity thereof on one side in a state before a tube expansion process. FIG. 17F is an exploded perspective view showing a crash box and vicinity thereof located on the other side in a state before a tube expansion process.

As shown in these figures, the bumper beam of this first practical example is to be mounted on the front end of an automobile and constitutes the vehicle shock absorbing member for absorbing impact energy at the time of collision. This bumper beam includes a bumper reinforcement 61, a pair of right and left crash boxes 62, a stay member 63 provided on a crash box 62 arranged on the right side of FIG. 17A, and a bumper stay 64 provided on the other crash box 62 arranged on the left side of FIG. 17A.

The bumper reinforcement 61 of the first practical example is formed by an extruded product, a drawn product, etc., of aluminum or its alloys as a material, for example.

The bumper reinforcement 61 of the first practical example is formed so that the intermediate portion is formed to slightly protrude forward with both side portions in the vehicle width direction bent backward.

The bumper reinforcement 61, in a cross-sectional shape when cut by a flat plane perpendicular to the lengthwise direction, includes a peripheral wall 611 formed into a rectangle shape longer in the up and down direction, and a partition wall 612 integrally formed at the intermediate position in the height direction of the peripheral wall 611 so as to bridge over the front and rear walls. Further, the partition wall 612 is formed continuously in the lengthwise direction (vehicle width direction) of the bumper reinforcement 61 with the exception of the portion where the attaching hole 615 is formed.

At both end portions of the bumper reinforcement 61 in the lengthwise direction, attaching holes 615 and 615 penetrating the front and rear walls are formed.

The inner peripheral shape of the attaching hole 615 is formed corresponding to the outer peripheral shape of the tip portion of the crash box 62, so that the tip portion of the crash box 62 can be loosely inserted into the attaching hole 615.

Similarly to the above, the crash box 62 is constituted by an extruded product, a drawn product, etc., using aluminum or its alloys as a material.

The crash box 62 includes a hollow cylindrical peripheral wall 621 with both the front end side and the rear end side open. In a cross-sectional shape cut by a flat plane perpendicular to the axial direction, the peripheral wall 621 is formed into a rounded approximately hexagonal shape. The peripheral wall 621 corresponds to the outer peripheral wall 1 of the shock absorbing member of the embodiment as shown in FIG. 1.

On the inside of the crash box 62, in the cross-sectional view, six ribs 622 as reinforcing partition walls radially extending from the center in the radial direction (in a radial manner) are integrally formed at equal intervals in the circumferential direction.

The ribs 622 are continuously formed in the central axis direction (front-back direction) of the crash box 62. Therefore, the opening at the tip portion side (front end side) and the opening at the base end side (rear end side) of the crash box 62 are communicated via each space between the ribs 622.

In a state in which the tip portion (front end portion) of the crash box 62 having the aforementioned structure is inserted into the attaching hole 615 and 615 of both the front and rear walls of the bumper reinforcement 61, by a tube expansion process which will be detailed later, protruded portions 625 protruding in the radially outward direction (outer radial direction) are formed at the front and the rear of the attaching holes 615 and 615 of the peripheral wall 621 of the crash box 62. The protruded portions 625 are pressure engaged with the peripheral edge portions of the attaching holes 615 and 615 of the bumper reinforcement 61, so that the crash box 62 is fixedly secured to the bumper reinforcement 61.

In the first practical example, the protruded portions 625 are provided on the approximately entire circumference of the crash box 62 in the circumferential direction, with the exception of the positions corresponding to the ribs 622. In other words, six protruded portions 625 extending in the circumferential direction are formed with equal intervals in the circumferential direction at the front and back positions of the attaching holes 615 and 615 on the outer peripheral surface of the crash box 62.

As shown in FIGS. 17D to 17F, the stay member 63 is constituted by aluminum, aluminum alloy, steel, etc. Further, the stay member 63 is constituted by a shaped product formed by, for example, press processing, die casting, forging, etc.

The stay member 63 is formed into an approximately hat shape in which a flange 633 is protruded outwardly (in the radially outward direction) from the opening edge portion of the cup-like portion 630 formed into a cup-shape. The cup-like portion 630 includes a cylindrical peripheral wall 631 and a bottom wall 632 integrally formed so as to close the base end side (rear end side) opening of the peripheral wall 631.

In this stay member 63, the bottom wall 632 functions as a bracket capable of attaching a member such as a towing hook, etc., and the flange 633 functions as a bumper stay capable of being fixed to a vehicle structure.

The peripheral wall 631 of the stay member 63 is formed into an approximately regular hexagonal shape corresponding to the outer peripheral shape of the base end portion of the crash box 62. Therefore, the base end portion of the crash box 62 can be accommodated inside the peripheral wall 631, or the cup-like portion 630. In other words, it is configured such that the cup-like portion 630 of the stay member 63 is outwardly fitted on the base end portion of the crash box 62.

On the outer surface (rear surface) of the bottom wall 632 of the stay member 63, a nut 65 for attaching a towing hook is provided in a manner such that the axial direction of the nut coincides with the axial direction of the stay member 63.

The tip portion side opening (front end side opening) of the screw hole 651 of the nut 65 is open at the inner surface of the bottom wall 632 of the stay member 63, or into the inside of the cup-like portion 630. Therefore, the male thread 663 of the towing hook 66 inserted from the opening of the stay member 63 can be screwed into the screw hole 651 of the nut 65.

In the first practical example, a female thread is constituted by the screw hole 651 of the nut 65.

Also, a wedge insertion hole 635 is formed at the central portion of the bottom wall 632 of the stay member 63, with the exception of the attachment region of the nut 65. The wedge insertion hole 635 is provided to prevent the wedge 683 from interfering with the bottom wall 632 of the stay member 63 at the time of the tube expansion process, as will be detailed later.

In the first practical example, a die interference prevention hole is constituted by the wedge insertion hole 635.

In the present invention, the flange 633 of the stay member 63 is not required to be integrally formed to the cup-like portion 630. Instead, a cup-like portion and a flange (bumper stay) can be produced separately and connected with each other using an appropriate fixing method. In this case, the cup-like portion and the flange (bumper stay) can be constituted by different materials.

Similarly, in the present invention, the bottom wall 632 of the cup-like portion 630 is not required to be integrally formed to the peripheral wall 631. Instead, a peripheral wall and a bottom wall can be produced separately and connected with each other using an appropriate fixing method. In this case, the peripheral wall and the bottom wall can be constituted by different materials.

The stay member 63 having the aforementioned structure is arranged such that the base end portion of the crash box 62 on one side is accommodated in the cup-like portion 630. In this way, the base end side opening of the crash box 62 is closed by the bottom wall 632 of the stay member 63. In this state, the inner surface of the bottom wall 632 of the stay member 63 is arranged so as to be in contact with the base end face of the crash box 62.

Then, in this state, protruded portions 626 and 636 each protruding in the radially outward direction will be formed on the peripheral wall 621 of the crash box 62 and the peripheral wall 631 of the stay member 63 by a tube expansion process which will be described later. In this way, the protruded portion 626 of the crash box 62 will be press fitted inside of the protruded portion 636 of the stay member 63, so that the stay member 63 is fixedly secured to the crash box 62.

In the first practical example, the protruded portions 626 and 636 are provided along the approximately entire circumference of the crash box 62 and the stay member 63 (cup-like portion 630) in the circumferential direction, with the exception of the positions corresponding to the ribs 622. In other words, six protruded portions 626 and 636 extending in the circumferential direction are formed on the base end side outer peripheral surface of the crash box 62 and the peripheral wall 631 of the stay member 63 at equal intervals in the circumferential direction.

In a state in which the stay member 63 is assembled to the base end portion of the crash box 62 in this way, the flange 633 of the stay member 63 is arranged so as to protrude in the radially outward direction at a predetermined position of the base end portion of the crash box 62.

The nut 65 provided on the bottom wall 632 of the stay member 63 is arranged corresponding to a portion between any two adjacent ribs 622 and 622 in the crash box 62. Therefore, the attaching portion of the nut 65 and vicinity thereof are communicated with the tip portion side opening of the crash box 62 via the portion between any two ribs 622 and 622 of the crash box 62.

The bumper stay 64 provided on the crash box 62 arranged on the left side of FIG. 17A is formed by an aluminum or its alloy plate-like shaped product.

As shown in FIG. 17F, an attaching hole 646 is formed at the center of the bumper stay 64. The inner peripheral shape of the attaching hole 646 is formed into an approximately regular hexagonal shape corresponding to the outer peripheral shape of the base end portion of the crash box 62 on the other side (left side of FIG. 17A), so that the base end portion of the crash box 62 can be loosely inserted into this attaching hole 646.

In a state in which the base end portion of the crash box 62 on the other side is inserted into the attaching hole 646 of the bumper stay 64, radially outwardly protruded portions 626 and 626 are formed ahead and behind the attaching hole 646 on the peripheral wall 621 of the crash box 62 by a tube expansion process which will be described later. In this way, the protruded portions 626 and 626 are pressure engaged with the peripheral edge portion of the attaching hole 46 of the bumper stay 64, thereby fastening the bumper stay 64 to the crash box 62 on the other side.

In the first practical example, the protruded portions 626 of the crash box 62 on the other side are formed along the approximately entire circumference of the crash box 62 in the circumferential direction, except for the positions corresponding to the ribs 622. In other words, a total of six protruded portions 626 extending in the circumferential direction are formed at the positions ahead and behind the attaching hole 646 on the outer peripheral surface of the crash box 62 at equal intervals in the circumferential direction.

In the first practical example, the operation to connect and fix the bumper reinforcement 61 to the crash boxes 62 and 62, the operation to connect and fix the stay member 63 to the crash box 62 on one side, and the operation to connect and fix the bumper stay 64 to the crash box 62 on the other side, are performed by a tube expansion process (expand process) using a tube expansion die (expand die).

Further, in the first practical example, the operation (tube expansion process) to connect and fix one side portion (right side of FIG. 17A) of the bumper reinforcement 61 to the crash box 62 on one side and the operation (tube expansion process) to connect and fix the stay member 63 to the crash box 62 on the one side are performed simultaneously. In the first practical example, this tube expansion process is called a tube expansion process on one side.

Also, in the first practical example, the operation (tube expansion process) to connect and fix the other side portion (left side of FIG. 17A) of the bumper reinforcement 61 to the crash box 62 on the other side and the operation (tube expansion process) to connect and fix the bumper stay 64 to the crash box 62 on the other side are performed simultaneously. In the first practical example, this tube expansion process is called a tube expansion process on the other side.

Figure 17G:
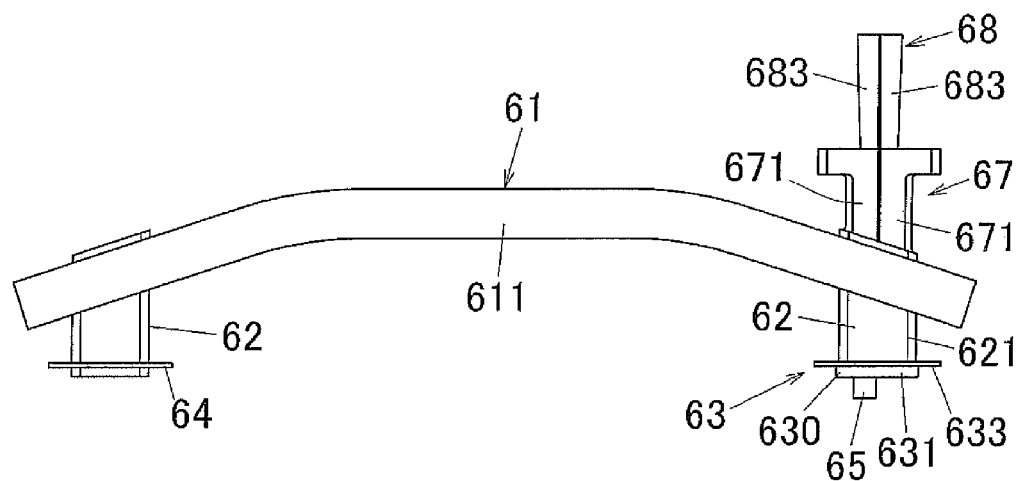
FIG. 17G is a plan view showing the bumper beam of the first practical example in a state in which a tube expansion die is inserted.
Figure 17H:
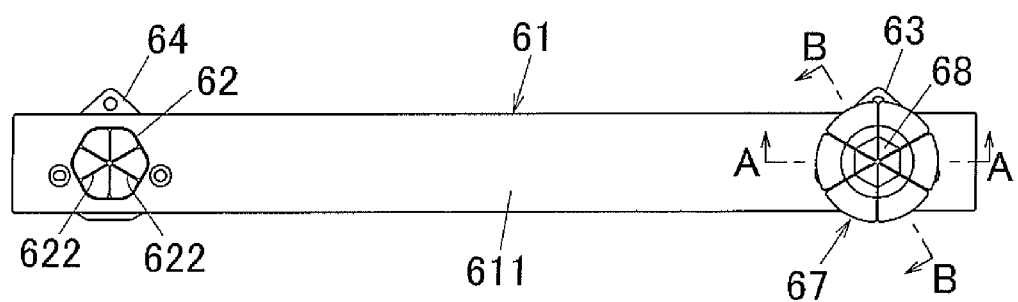
FIG. 17H is a front view showing the bumper beam of FIG. 17G in a vertically reversed state.
Figure 17I:
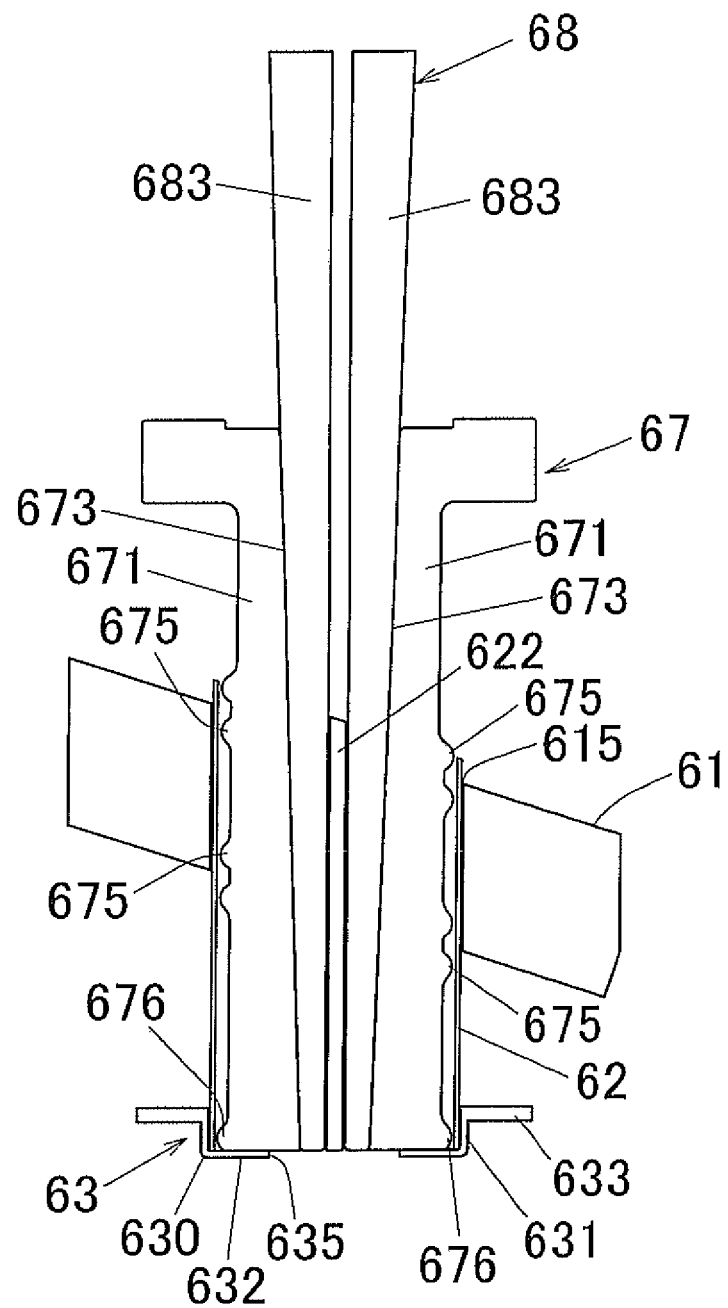
FIG. 17I is a cross-sectional view taken along the A-A line of FIG. 17H.
Figure 17J:
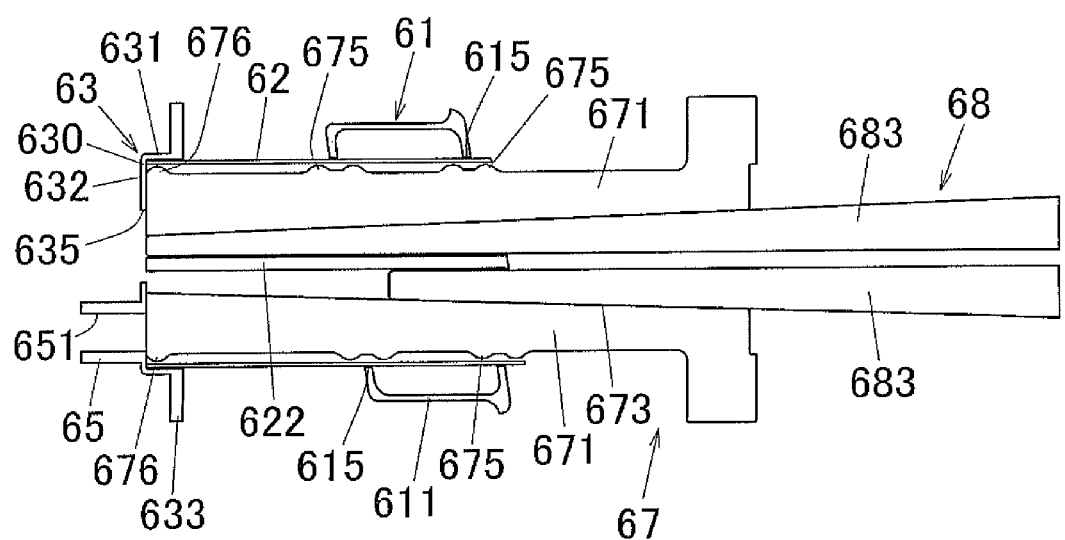
FIG. 17J is a cross-sectional view taken along the B-B line of FIG. 17H.

FIG. 17G is a plan view showing the bumper beam of the first practical example in a state in which a tube expansion die is inserted. FIG. 17H is a front view thereof. FIG. 17I is a cross-sectional view take along the A-A line of FIG. 17H. FIG. 17J is a cross-sectional view take along the line B-B of FIG. 17H. Furthermore, for easier understanding of the present invention, the front view of FIG. 17H is shown in a vertically inverted state.

As shown in these figures, the tube expansion die 67 for performing a tube expansion process on one side is provided with a plurality (six) of split dies 671 each to be inserted between the ribs 622 of the crash box 62. The cross-sectional shape of each split die 671 are formed into an approximately fan shape corresponding to the inner peripheral shape between the ribs 622. Further, each split die 671 is formed to have the same cross-sectional shape with each other.

On the outer peripheral surface of each split die 671, corresponding to the positions where the protruded portions 625 and 625 of the crash box 62 at the bumper reinforcement 61 side are formed, tip portion side forming convex portions 675 and 675 are formed. Further, on the outer peripheral surface of each split die 671, corresponding to the positions where the protruded portions 626 and 636 of the crash box 62 and the stay member 63 are formed, base end side forming convex portion 676 is formed.

Further, each split die 671 is provided with a wedge insertion portion 673 along the axial center thereof. The wedge insertion portion 673 of each split die 671 is formed such that each wedge insertion portion 673 is formed into an approximately ⅙ six-sided pyramid shape so that the wedge insertion portions 673 are formed into an approximately regular six-sided pyramid shape in a gathered state.

Further, the mandrel 68 for driving the tube expansion die 67 to expand the diameter includes a wedge 683 corresponding to the wedge insertion portion 673 of each split die 671. Each wedge 683 is formed so that the tip portion side (insertion direction side) thereof is formed into a tapered shape corresponding to the inner peripheral shape of each wedge insertion portion 673. That is, the wedge 683 is formed such that each wedge 683 is formed into an approximately ⅙ regular six-sided pyramid shape so that the wedges form an approximately regular six-sided pyramid shape in a gathered state. The taper angle of the outer peripheral surface of each wedge 683 is set to be equal to the taper angle of the inner peripheral surface of each wedge insertion portion 673.

Further, among the plurality (six) of wedges 683, the wedge 683 corresponding to the position of the nut 65 in the stay member 63, in other words, the wedge 683 corresponding to the region of the bottom wall 632 of the stay member 63 where the wedge insertion hole 635 is not formed, is cut to remove the tip portion (insertion side end portion), resulting in a length shorter than the other wedge 683. This is, as will be detailed later, to prevent the wedge 683 of the tube expansion die 67 from interfering with the bottom wall 632 of the stay member 63.

In performing a tube expansion process on one side using the tube expansion die 67 having the aforementioned structure, the tip portion of the crash box 62 on one side is inserted into the one side attaching hole 615 of the bumper reinforcement 61, and the cup-like portion 630 of the stay member 63 is outwardly fitted on the base end portion of the crash box 62 on one side. At the time of the outward fitting, by bringing the inner surface of the bottom wall 632 of the stay member 63 into contact with the base end face of the crash box 62 on one side, the positioning of the stay member 63 with respect to the crash box 62 can be performed. Therefore, by merely outwardly fitting the stay member 63 on the crash box 62, the flange 633 can be accurately positioned at a desired position of the crash box 62.

Then, in this state, as shown in FIGS. 7G to 7J, each split die 671 of the tube expansion die 67 is inserted in between the ribs 622 in the crash box 62 from the tip portion side (front end side) opening. In this case, the shaping convex portions 675 and 676 of each split die 671 are arranged at scheduled regions (protruded portion forming scheduled regions) where protruded portions 625, 626, and 636 of the crash box 62 and the stay member 63 are to be formed.

In this state, the mandrel 68 is pressed in the axial direction to thereby forcibly press each wedge 683 into each wedge insertion portion 673 of each split die 671. With this, each split die 671 is moved in the radially outward direction to subject the protruded portion forming scheduled regions of the crash box 62 and the stay member 63 to a tube expansion process (expand process).

In this tube expansion process, the protruded portion forming scheduled regions of the crash box 62 and the stay member 63 are partially expanded in the radially outward direction, and therefore the aforementioned protruded portions 625, 626 and 636 are formed on the crash box 62 and the stay member 63. Thus, the connecting operation of the crash box 62 on one side and the one side portion of the bumper reinforcement 61 and the connecting operation of the crash box 62 on one side and the stay member 63 are performed simultaneously.

In the first practical example, when the press-in operation of the mandrel 68 is performed, it becomes possible to assuredly prevent each wedge 683 from interfering with the bottom wall 632 of the stay member 63. That is, as explained above, among the plurality (six) of wedges 683 of the mandrel 68, the wedge 683 arranged at the position corresponding to the nut 65 of the stay member 63 is cut in the tip portion into a length shorter than the other wedge 683. Further, in the region where the nut 65 is not attached to the bottom wall 632 of the stay member 63, the wedge insertion hole 635 is formed. Therefore, when the mandrel 68 is pressed in, the wedge 683 corresponding to the nut 65 does not reach the bottom wall 632 to which the nut 65 is attached, which prevents interference with the bottom wall 632 of the stay member 63 or the nut 65. Further, the other wedges 683 are inserted into the wedge insertion hole 655, which prevents interference with the bottom wall 632 of the stay member 63.

After forming the protruded portions 625, 626 and 636, the mandrel 68 is pulled out, and the tube expansion die 67 is reduced in diameter and then pulled out of the crash box 62.

The tube expansion process for the other side is performed essentially in the same manner as in the tube expansion process for the one side. As the tube expansion die 67 used in the tube expansion process for the other side, a plurality of split dies 671 which are all the same in length are used. Further, the base end side forming protruded portion 676 of each split die 683 is provided corresponding ahead and behind of the attaching hole 646 of the bumper stay 64 on the other side. In this tube expansion die 67 for the other side, the other structures are essentially the same as the aforementioned tube expansion die 67.

Further, the operation procedures of the tube expansion process are essentially the same. That is, the tip portion of the crash box 62 on the other side is inserted into the attaching hole 615 of the bumper reinforcement 61 on the other side, and the base end portion of the crash box 62 on the other side is inserted into the attaching hole 646 of the bumper stay 64 on the other side. In this state, each split die 671 of the tube expansion die 67 is inserted in between the ribs 622 in the crash box 62, and the mandrel 68 is forcibly inserted. With this, the protruded portion forming scheduled regions of the crash box 62 are locally expanded to thereby form the protruded portions 625 and 626 protruded in the radially outward direction. Thus, the connection operation for fixing the crash box 62 on the other side to the bumper reinforcement 61 and the connection operation for fixing the crash box 62 on the other side to the bumper stay 64 are performed simultaneously.

In the present invention, by forcibly inserting mandrels 68 and 68 simultaneously with the tube expansion dies 67 and 67 arranged in the crash boxes 62 and 62 on one side and the other side, the tube expansion processes for one side and the tube expansion process for the other side can be performed simultaneously. In this case, the productivity can be further improved.

As mentioned above, the bumper reinforcement 61, the stay member 63, and the bumper stay 64 are fixedly connected to the crash box 62, resulting in an assembled bumper beam.

In this bumper beam, the crash box 62 on one side is attached to a vehicle body via the flange 633 (bumper stay) of the stay member 63, and the crash box 62 on the other side is attached to the vehicle body via the bumper stay 64. That is, the flange 633 and the bumper stay 64 are fixed to tip portions of non-illustrated both side frames (both side members) as vehicle structural members by bolting, welding, etc. Thus, the bumper beam is attached to a vehicle body.

In an automobile in which the bumper beam is mounted, when an impact is applied to the bumper reinforcement 61 by collision, the crash box 62 is compressively deformed in the axial direction (in the vehicle front-back direction) so that the impact energy is absorbed by the deformation.

On the other hand, as shown in FIGS. 17D and 17E, the towing hook 66 includes a shaft portion 661, a hook body 662 provided at the tip portion of the shaft portion 661, and a male thread 663 formed on the base end portion (insertion side end portion) of the shaft portion 661.

In the case of attaching the towing hook 66 to an automobile in which the bumper beam is mounted, via the tip portion side opening of the crash box 62 on one side, the shaft portion 661 of the towing hook 66 is inserted in between the aforementioned predetermined ribs 622 and 622 of the crash box 62 with the male thread 663 as an insertion side. When the male thread 663 of the towing hook 66 has reached the nut 65, the towing hook 66 is rotated to screw the male thread 663 into the screw hole 651 of the nut 65 to thereby fix them. With this, the towing hook 66 is attached to a vehicle body in a state in which the hook body 662 is arranged forward than the tip portion (front end) of the crash box 62.

Further, when detaching the towing hook 66, the detachment can be made by performing an operation opposite to the above. That is, the towing hook 66 is rotated to loosen the screw, and after detaching the male thread 663 from the nut 65, the towing hook 66 is pulled out of the tip portion side opening of the crash box 62.

Figure 17K:
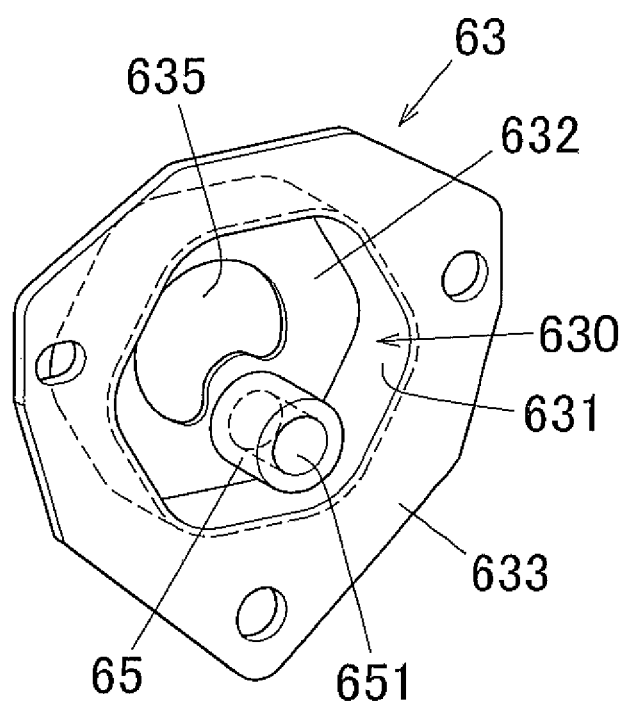
FIG. 17K is a perspective view showing a modified example of a stay member used in the bumper beam of the first practical example.

In the aforementioned first practical example, as the stay member 63, a member in which the nut 65 is arranged on the outer surface (rear surface) of the bottom wall 632 is used, but not limited to it. In the present invention, as shown in FIG. 17K, it can be configured to arrange a nut 65 on the inner surface (front surface) of the bottom wall 632 of the stay member 63.

Figure 17L:
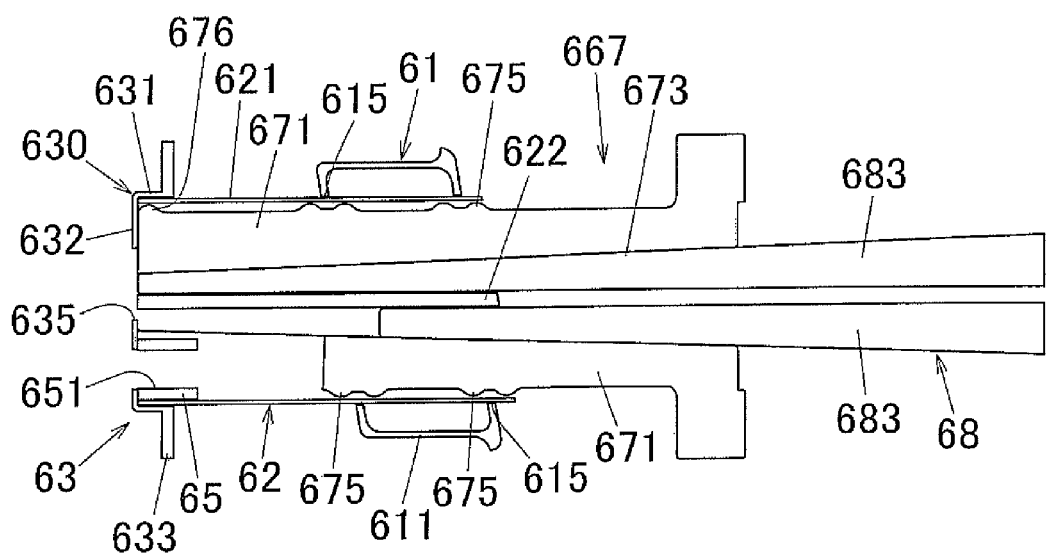
FIG. 17L is a cross-sectional view showing the crash box and vicinity thereof of the bumper beam in a state immediately after inserting the die.

In this case, in order to secure the stay member 63 to the crash box 62, it is preferable to use a tube expansion die 67 as shown in FIG. 17L.

That is, the nut 65 arranged on an inner surface of the bottom wall 632 of the stay member 63 is arranged at the tip portion side than the base end position in the crash box 62. Therefore, there is a risk that the split die 671 of the tube expansion die 67 interferes with the nut 65 to prevent the insertion of the split die 671. For this reason, in the modified embodiment shown in FIG. 17L, as a split die 671 corresponding to the nut 65, among a plurality of split dies 671 of the tube expansion die 67, a short split die in which the tip portion (insertion side end portion) was removed is used.

Further, in the aforementioned first practical example, a push type tube expansion die for forcibly pressing a die into a mandrel is used as a tube expansion die, but not limited to it, and the present invention allows to use any tube expansion dies as long as it is possible to perform a tube expansion process. For example, it is possible to employ a pull type tube expansion die in which a mandrel is pulled in from a die.

Figure 17M:
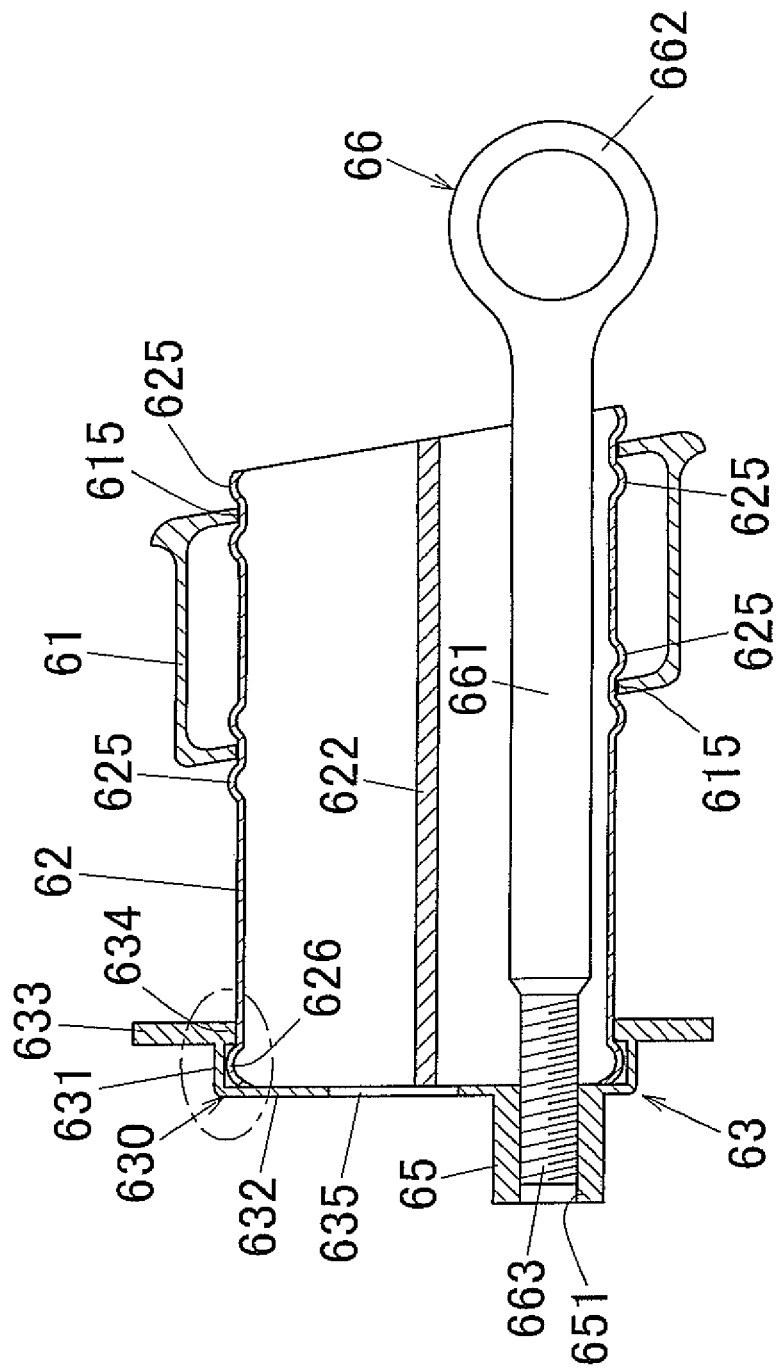
FIG. 17M is a side cross-sectional view showing the crash box and vicinity thereof of the vehicle bumper beam on one side according to a second practical example using the shock absorbing member of the present invention in a towing hook attached state.
Figure 17N:
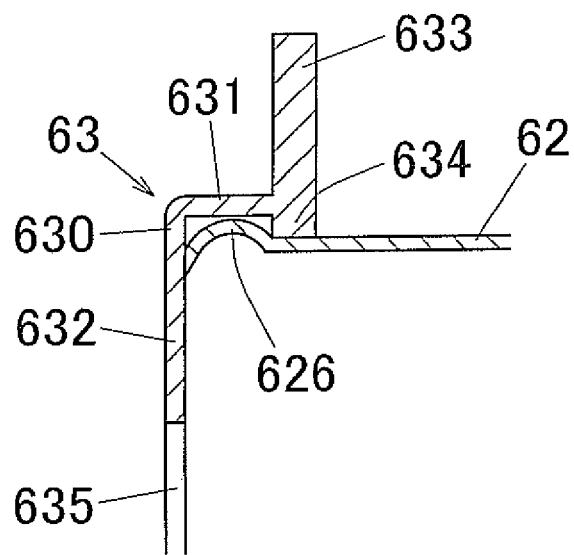
FIG. 17N is an enlarged cross-sectional view showing the portion in FIG. 17M surrounded by the dotted line.

FIG. 17M is a side cross-sectional view showing a crash box and vicinity thereof on one side in a vehicle bumper beam according to a second practical example in a towing hook attached state. FIG. 17N is an enlarged cross-sectional view showing the portion surrounded by the dashed-dotted line in FIG. 17M.

As shown in these figures, in the stay member 63 used in the vehicle bumper beam of this second practical example, the inner diameter size of the peripheral wall 631 of the cup-like portion 630 is formed to be larger than that of the peripheral wall 631 of the aforementioned first practical example, so that the base end side of the crash box 62 can be accommodated in the cup-like portion 630 with room. At the opening edge portion of the stay member 63, an inwardly extended flange-shaped retaining protrusion 634 is formed along the circumferential entire region so as to extend in the radially inward direction.

In a state in which the base end portion of the crash box 62 is accommodated in the cup-like portion 630 of the stay member 63, a radially outwardly protruded portion 626 is formed at the position of the peripheral wall 621 of the crash box 62 corresponding to the cup-like portion 630 by a tube expansion process using a tube expansion die 67. In this structure, the retaining protrusion 634 is engaged with the protruded portion 626 to regulate the movement of the stay member 63 rearward with respect to the crash box 62 to be retained. Needless to say, the bottom wall 632 of the stay member 63 is in contact with and engaged with the base end face of the crash box 62, so that the stay member 63 is regulated so as not to move forward with respect to the crash box 62. Thus, the stay member 63 is fixedly connected to the crash box 62 in a state in which the movement of the stay member 63 is regulated in the front-back direction.

In this tube expansion process, no protruded portion will be formed on the peripheral wall 631 of the stay member 63.

In this bumper beam of the second practical example, since the other structures are essentially the same as those of the bumper beam of the aforementioned first practical example, the cumulative explanation will be omitted by allotting the same reference symbol to the same or corresponding portion.

Figure 17O:
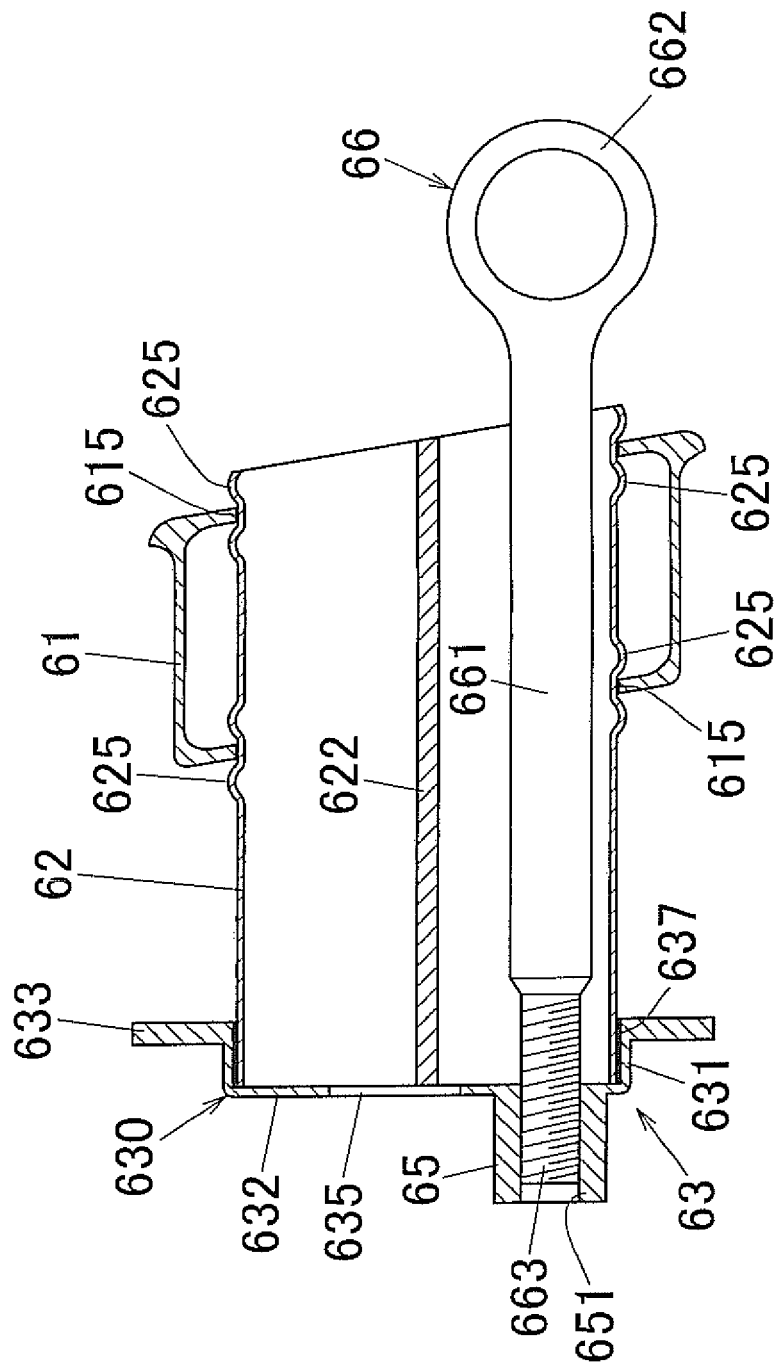
FIG. 17O is a side cross-sectional view showing the crash box and vicinity thereof of the vehicle bumper beam located at one end according to a third practical example using the shock absorbing member of the present invention in a towing hook attached state.

FIG. 17O is a side cross-sectional view showing a crash box on one side and vicinity thereof of a vehicle bumper beam according to a third practical example in a towing hook attached state.

As shown in this figure, in this third practical example, the stay member 63 is connected to the crash box 62 using adhesive agent 637. That is, in this third practical example, without forming a protruded portion on the crash box 62 and the stay member 63 by a tube expansion process, the peripheral wall outer surface of the crash box 62 and the peripheral wall inner surface of the stay member 63 are adhered via the adhesive agent 637.

As the adhesive agent 637, any commonly-used adhesive agent can be used as long as it is possible to adhere such that the stay member 63 cannot be pulled out of the crash box 62. That is, the force of the stay member 63 acting on the bottom wall 632 in the axial direction (in the vehicle front-back direction) does not directly act on between the peripheral walls of the crash box 62 and the stay member 63, but acts on the vehicle structural member, etc., via the flange 633 of the stay member 63. For this reason, the joint strength between the peripheral walls of the crash box 62 and the stay member 63 can be small. Therefore, the peripheral walls of both the crash box 62 and the stay member 63 can be secured using a common well-known adhesive agent 637.

In this third practical example, since the other structures are essentially the same as those in the aforementioned first and second practical examples, the cumulative explanation will be omitted by allotting the same reference symbol to the same or corresponding portion.

Figure 17P:
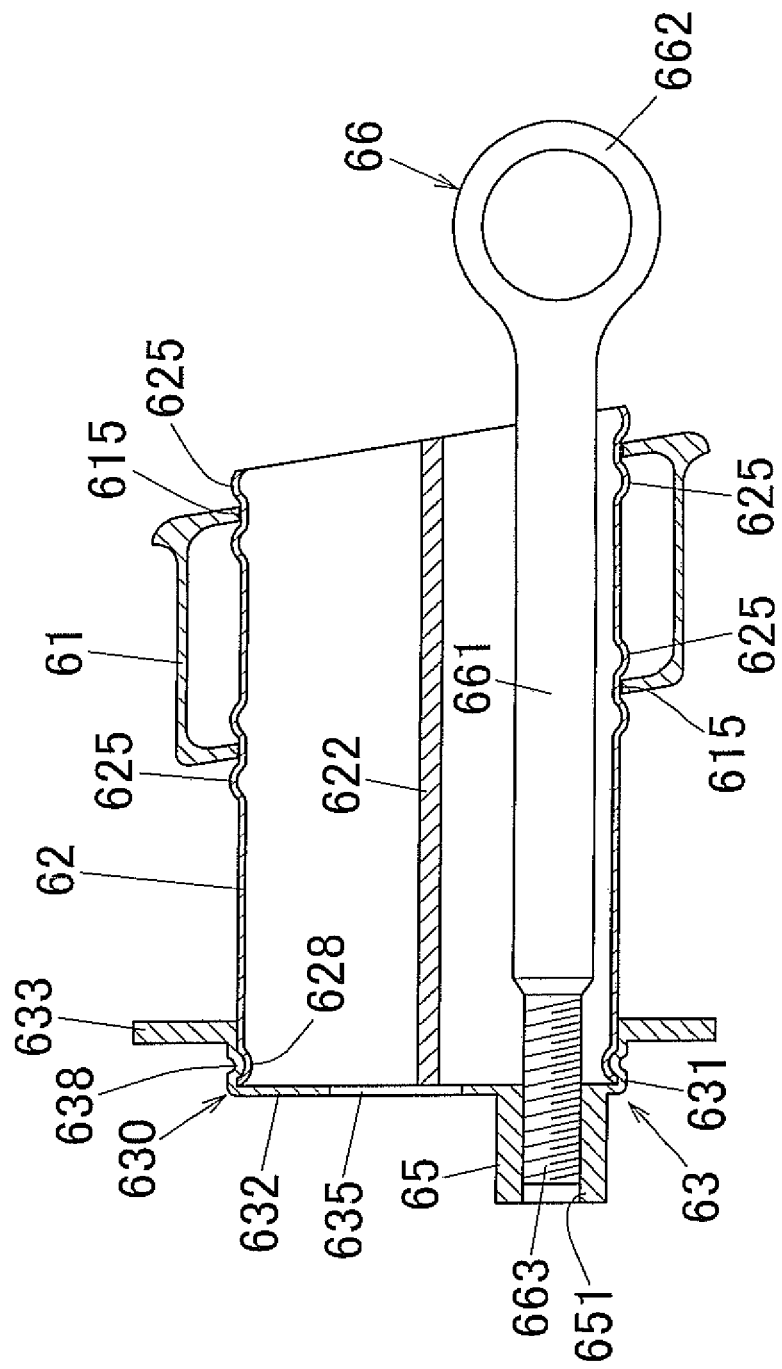
FIG. 17P is a side cross-sectional view showing the crash box and vicinity thereof of the vehicle bumper beam located at one end according to a fourth practical example using the shock absorbing member of the present invention in a towing hook attached state.

FIG. 17P is a side cross-sectional view showing a crash box and vicinity thereof of a vehicle bumper beam of a fourth practical example in a towing hook attached state.

As shown in this figure, in this fourth practical example, the corresponding portions of both the peripheral walls 621 and 631 of the crash box 62 and stay member 63 are partially deformed inwardly by performing a tube reduction process using a well-known tube reduction die to thereby form protruded portions 628 and 638 protruded in the radially inward direction on corresponding portions of both the peripheral walls 621 and 631. Thus, the protruded portion 638 of the stay member 63 is press fixed to the inner side of the protruded portion 628 of the crash box 62 so that the stay member 63 is connected to the crash box 62.

In this fourth practical example, the inwardly protruded portions 628 and 638 are formed on the crash box 62 and the stay member 63 along the approximately entire periphery in the circumferential direction, except of the positions corresponding to the ribs 622. In other words, six inwardly protruded portions 628 and 638 extending in the circumferential direction are formed on the base end side outer peripheral surface of the crash box 62 and the peripheral wall 631 of the stay member 63 at equal intervals in the circumferential direction.

In this fourth practical example, since the other structures are essentially the same as those in the aforementioned first to third practical examples, etc., the cumulative explanation will be omitted by allotting the same reference symbol to the same or corresponding portion.

Figure 18A:
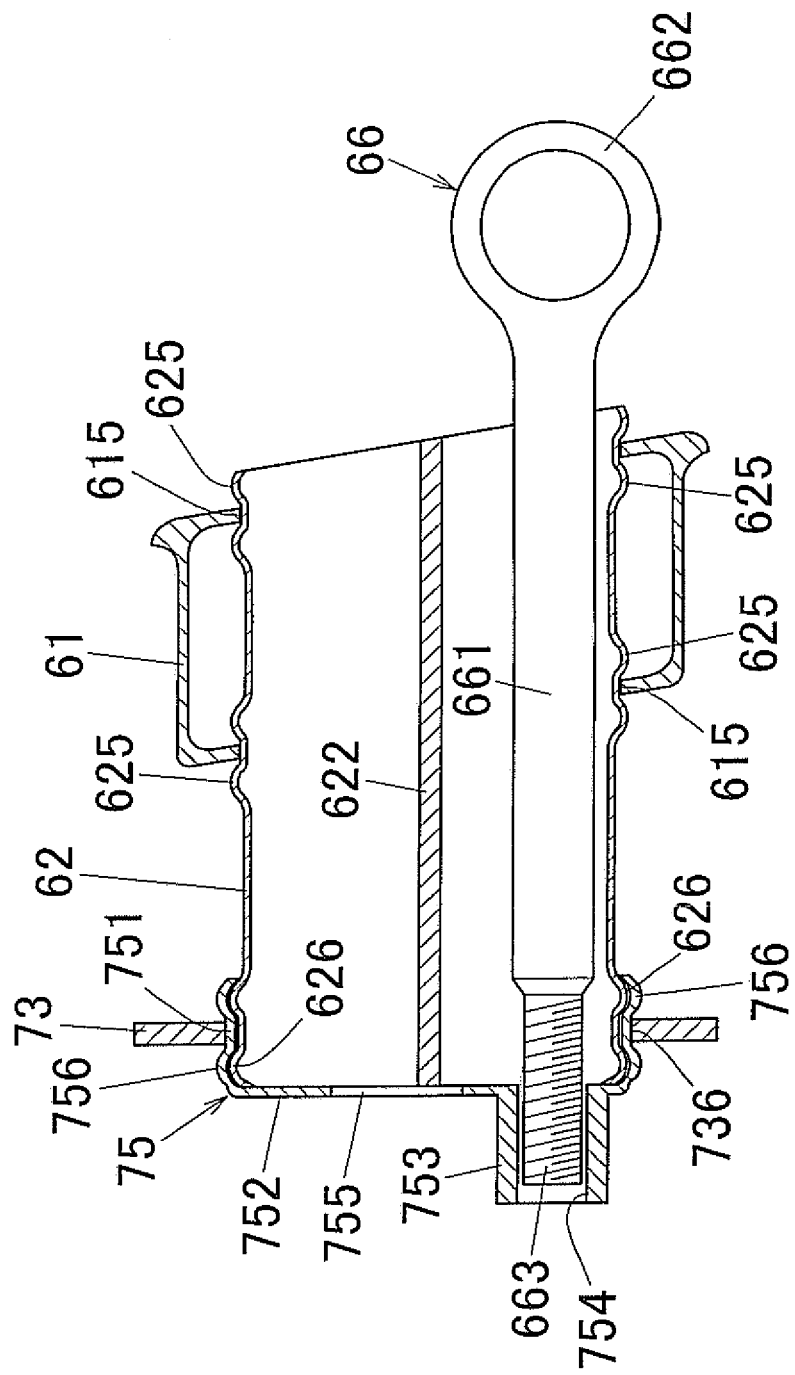
FIG. 18A is a side cross-sectional view showing the crash box and vicinity thereof of the vehicle bumper beam located at one end according to a fifth practical example using the shock absorbing member of the present invention in a towing hook attached state.
Figure 18B:
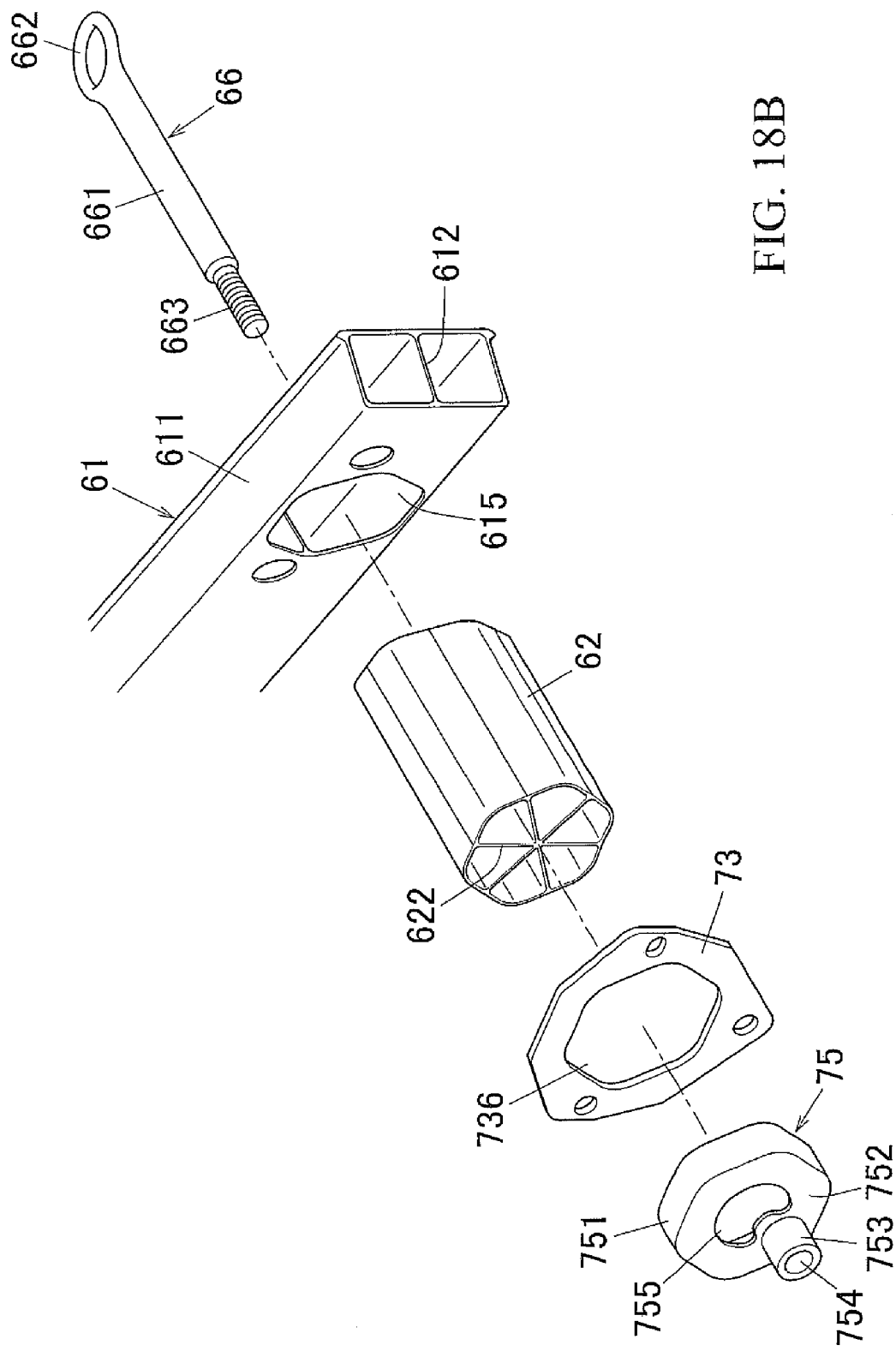
FIG. 18B is an exploded perspective view of FIG. 18A.
Figure 19:
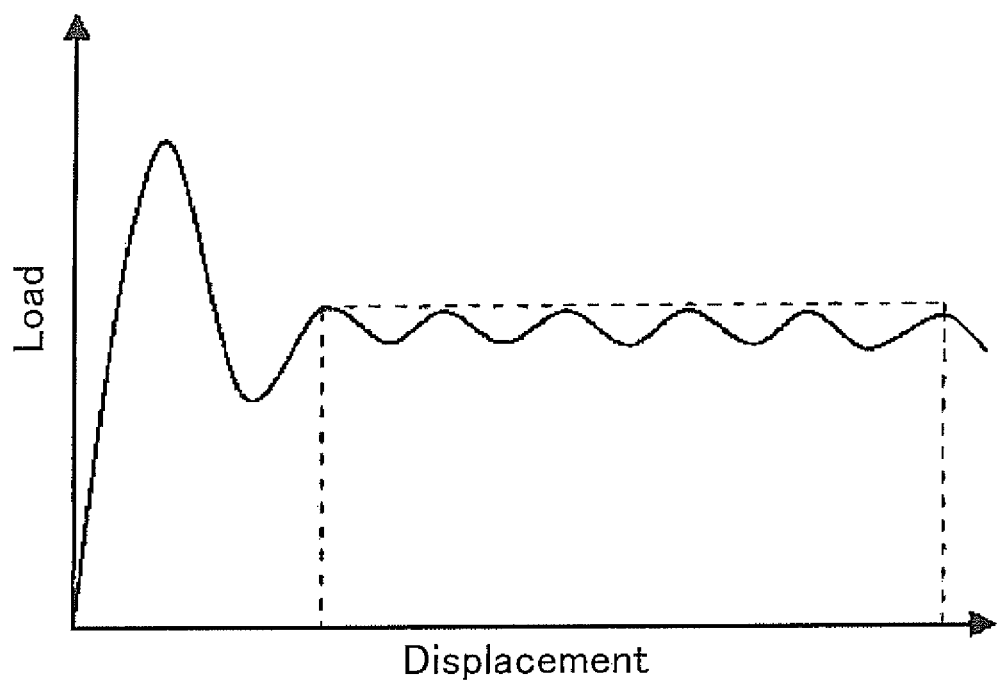
FIG. 19 is a schematic load-displacement diagram of a buckling-deformation type shock absorbing member.

FIG. 18A is a side cross-sectional view showing a crash box and vicinity thereof of a vehicle bumper beam according to a fifth practical example in a towing hook attached state, and FIG. 18B is an exploded perspective view thereof.

As shown in both figures, the hook attaching member 75 for attaching the towing hook 66 is formed by aluminum, its alloy, steel, etc. Further, the hook attaching member 75 is constituted by a shaped member formed by, e.g., press forming, die-casting, forging, etc.

This hook attaching member 75 is formed into a cup-like shape and includes a cylindrical peripheral wall 751 and a bottom wall 752 integrally formed so as to close the base end side (rear end side) opening of the peripheral wall 751.

The peripheral wall 751 of the hook attaching member 75 is formed into an approximately regular hexagonal shape corresponding to the outer peripheral shape of the base end portion of the crash box 62. The peripheral wall 751 is configured such that the base end portion of the crash box 62 can be loosely inserted into the inside of the peripheral wall 751 from its tip portion side (front end side) opening. In other words, it is configured such that the peripheral wall 751 of the hook attaching member 75 can be outwardly fitted on the base end portion of the crash box 62.

On the outer surface (rear surface) of the bottom wall 752 of the hook attaching member 75, a towing hook attaching nut 753 is provided with the axial direction aligned with the axial direction of the hook attaching member 75. The tip portion side opening (front end opening) of the screw hole 754 of the nut 753 is open to the inner surface of the bottom wall 752 of the hook attaching member 75, or the inner side of the peripheral wall 751 of the hook attaching member 75. Therefore, the male thread 663 of the towing hook 66 inserted from the tip portion side (front end side) opening of the hook attaching member 75 can be screwed into the screw hole 754 of the nut 753.

In this embodiment, a female thread is constituted by the screw hole 754 of the nut 753.

At the center portion of the bottom wall 752, a wedge insertion hole 755 is formed except for the attachment region of the nut 753. This wedge insertion hole 755 is formed to prevent a wedge as a tube expansion die from interfering with the bottom wall 752 of the hook attaching member 75 at the time of tube expansion process.

The hook attaching member 75 having the aforementioned structure is outwardly fitted on the base end portion of the crash box 62 on one side. That is, the base end portion of the crash box 62 on one side is inserted into the inside of the peripheral wall 751 of the hook attaching member 75 from the tip portion side opening, so that the bottom wall 752 of the hook attaching member 75 is arranged so as to close the base end side opening of the crash box 62.

Further, in a state in which the hook attaching member 75 is outwardly fitted on the base end portion of the crash box 62, the nut 753 of the hook attaching member 75 is arranged between any two adjacent ribs 622 and 622 in the crash box 62. Therefore, the nut 753 communicates with the tip portion side opening of the crash box 62 via between the aforementioned any two ribs 622 and 622 of the crash box 62.

The bumper stay 73 is formed by a plate-like shaped product of aluminum or its alloy.

At the center of the bumper stay 73, an attaching hole 736 is formed. The inner peripheral shape of the attaching hole 736 of the bumper stay 73 is formed corresponding to the outer peripheral shape of the peripheral wall 751 of the hook attaching member 75, so that the peripheral wall 751 of the hook attaching member 75 can be loosely inserted into the attaching hole 736.

As explained above, the peripheral wall 751 of the hook attaching member 75 outwardly fitted on the base end portion of the crash box 62 on one side is inserted into the attaching hole 736 of the bumper stay 73 on one side. With this state, by the same tube expansion process as mentioned above, protruded portions 626, 626, 756 and 756 protruded in the radially outward direction are formed on the peripheral wall 621 of the crash box 62 and the peripheral wall 751 of the hook attaching member 75 at the front and rear of the attaching hole 736. With this, the protruded portions 626 and 626 of the crash box 62 are forcibly inserted into the inside of the protruded portions 756 and 756 of the hook attaching member 75, so that the hook attaching member 75 is fixed to the crash box 62. Further, the protruded portions 756 and 756 of the hook attaching member 75 come into pressure contact with and are engaged with the peripheral edge portions of the attaching hole 736 of the bumper stay 73 so that the bumper stay 73 is fixed to the hook attaching member 75. Thus, the hook attaching member 75 and the bumper stay 73 are secured to the crash box 62.

In the fifth practical example, since the other structures are essentially the same as those of the aforementioned first to fourth practical examples, the duplicate explanation will be omitted by allotting the same or corresponding reference symbol to the same or corresponding portion.

In the bumper beams of the aforementioned first to fifth practical examples explained above, the crash box 62 is fixed to the bumper reinforcement 61 or the bumper stay 73 by forming the outwardly protruded portion 625 or 626 which is a tube expanded portion or the inwardly protruded portion 628 which is a tube reduced portion in the crash box 62. For this reason, when the crash box 62 is plastically deformed to absorb collision energy, the expanded tube portion or the reduced tube portion becomes a starting point at the time of plastic deformation, which causes the crash box 62 to be smoothly deformed into an accordion manner. Therefore, the initial load will not increase excessively and the difference between the initial load value and the average load value can be reduced.

Further, in the bumper beams of the aforementioned first to fifth practical examples, there is no need to provide an exclusive step for forming a weak portion which becomes a starting point of plastic deformation of the crash box 62, and therefore the number of steps can be reduced, and the cost can be reduced.

Furthermore, in this bumper beam, the die expanded joint portion connecting the crash box 62 to the bumper reinforcement 61 functions as a weak portion which becomes a starting point at the time of plastic deformation. This further decreases the difference between the initial load and the average load at the time of plastic deformation of the crash box 62.

Further, in the bumper beams of the aforementioned first to fifth practical examples, there is no adverse influence by heat caused when the crash box 62 is secured to the bumper reinforcement 61 by welding. Furthermore, in the bumper beam of the aforementioned first to fifth practical examples, no dead stroke will be generated when the crash box 62 is secured to the bumper reinforcement 61 with a bolt and a nut.

Further, in the production methods of the bumper beams of the aforementioned first to fifth practical examples, since the tube expanded portion, etc., is formed using a tube expansion die as mentioned above, it is possible to manufacture a bumper beam small in the difference between the initial load and the average load at the time of plastic deformation at low cost. For example, in the diameter expansion method of an aluminum alloy extruded member by electromagnetic forming, an electromagnetic forming coil is inserted into the inside of the aluminum alloy extruded member, and an instantaneous large-current is applied through the electromagnetic forming coil to thereby perform the diameter expansion. In cases where ribs 622 are formed in an outer peripheral wall portion like in the crash box of the present invention, it is difficult to use the diameter expansion method by this electromagnetic forming.

On the other hand, the production methods of the bumper beams according to the aforementioned first to fifth practical examples can be assuredly applied to a crash box of the present invention in which ribs are provided within an outer peripheral wall portion of a crash box. This enables an assured production of a bumper beam which can exert the aforementioned effects.

However, in the present application, the method of connecting the crash box which is a shock absorbing member and a bumper reinforcement and a bumper stay is not specifically limited. For example, the crash box, the bumper reinforcement and the bumper stay can be connected by welding or via adhesive agent, or by fastening a bolt and a nut.

The shock absorbing member of the present invention can also be applied to a crash box of a front under lump protector for a large-sized vehicle, or a crash box for protecting a pedestrian or a passenger.

In the aforementioned embodiments, although the explanations were made by exemplifying a shock absorbing member having an outer peripheral wall approximately regular hexagonal in cross-section, the present invention is not limited to that. The present invention can also be applied to any shock absorbing members as long as its cross-sectional shape is polygonal. However, considering the stability, etc., of behavior at the time of buckling deformation, it is preferable to employ a shock absorbing member having an outer peripheral wall of a regular pentagon to a regular octagon, especially a shock absorbing member having an outer peripheral wall of a regular hexagon like in the aforementioned embodiments.

EXAMPLES

Hereinafter, Examples related to the present invention and Comparative Examples deviated from the gist of the present invention will be explained.

For sample models of Examples 1 to 9 and Comparative Examples 1 to 6, FEM analyses of deformed states (deformation configurations) when compressively deformed in the axial direction were performed using finite element analysis software (LS-DYNA). The material of each sample model was an aluminum alloy extruded member approximately regular hexagon in the basic cross-section and having an outer diameter (outer size) of 90 mm and a length of 200 mm. The material yield strength was set to 180 MPa.

Further, the length of the half-side portion L of each sample model in a cross-section perpendicular to the axial direction, the curvature radius R of the outer peripheral surface on the vertex arc portion 3, R/L, the rib thickness ta, the outer wall thickness tb, and tb/ta were set as shown in Table 1.

The distance M0 from the center P0 to the virtual vertex C, the shortest distance M from the vertex P3 to the virtual straight line P2-P2 connecting the rib connection points P2 and P2 arranged at both sides of the vertex P3, M/M0, M/L, and M×tb were set as shown in Table 2.

The length L of the half-side portion was 25.98 mm, and the distance M0 was 12.99 mm.

Under the set conditions, a method was employed, in which rigid walls were set at longitudinal both ends of the extruded member of each sample model and one of the rigid wall was forcibly moved in a direction of compressing in the axial direction, and the deformed state at that time was measured by the aforementioned FEM analysis.

A load-displacement diagram obtained from the analysis results is shown in FIGS. 5A to 5I (Examples 1 to 9) and FIGS. 6A to 6F (Comparative Examples 1 to 6). Further, from the load-displacement diagram of each Example and Comparative Example, the maximum load and the average load in the section in which the amount of displacement (stroke) was 15 mm to 150 mm were read out, and the ratio of the average load to the maximum load (average load/maximum load) was calculated. These results are also shown Table 1.

From the above analysis results, the deformed states of sample models of each Example and Comparative Example in the cross-sectional view when the amount of deformation was 100 mm at the time of buckling deformation were obtained, and classified into two states "A" and "B."

TABLE 1

| | | Cross-sectional size/mm | | | | | | Analysis results (amount of displacement: 15-100 mm section) | | | |
|---|---|---|---|---|---|---|---|---|---|---|---|
| | | Outer size | Half-side portion Length (L) | R | R/L | Rib thickness (ta) | Outer peripheral wall thickness (tb) | tb/ta | Maximum load (kN) | Average load (kN) | Ave/Max | Deformed state |
| Example | 1 | 90 | 25.98 | 1 | 0.04 | 2 | 1.5 | 0.75 | 118.6 | 106.1 | 0.895 | A |
| | 2 | 90 | 25.98 | 3 | 0.12 | 2 | 1.5 | 0.75 | 117.6 | 107 | 0.91 | A |
| | 3 | 90 | 25.98 | 5 | 0.19 | 2 | 1.5 | 0.75 | 116.6 | 105 | 0.905 | A |
| | 4 | 90 | 25.98 | 10 | 0.38 | 2 | 1.5 | 0.75 | 117 | 104.2 | 0.891 | A |
| | 5 | 90 | 25.98 | 15 | 0.58 | 2 | 1.5 | 0.75 | 118.2 | 103 | 0.871 | A |
| | 6 | 90 | 25.98 | 20 | 0.77 | 2 | 1.5 | 0.75 | 120.4 | 102.6 | 0.852 | A |
| | 7 | 90 | 25.98 | 20 | 0.77 | 2 | 0.7 | 0.35 | 74.9 | 65.5 | 0.874 | A |
| | 8 | 90 | 25.98 | 20 | 0.77 | 2 | 1 | 0.5 | 89.5 | 78.3 | 0.875 | A |
| | 9 | 90 | 25.98 | 20 | 0.77 | 2 | 1.25 | 0.625 | 102 | 89.9 | 0.881 | A |
| Comparative Example | 1 | 90 | 25.98 | 0 | 0 | 2 | 1.5 | 0.75 | 122.4 | 103.9 | 0.849 | B |
| | 2 | 90 | 25.98 | 30 | 1.15 | 2 | 1.5 | 0.75 | 118.1 | 98.6 | 0.835 | B |
| | 3 | 90 | 25.98 | 20 | 0.77 | 2 | 0.3 | 0.15 | 58.2 | 49.2 | 0.845 | B |
| | 4 | 90 | 25.98 | 20 | 0.77 | 2 | 0.5 | 0.25 | 66.5 | 57 | 0.857 | B |
| | 5 | 90 | 25.98 | 20 | 0.77 | 2 | 1.75 | 0.875 | 140.1 | 116 | 0.828 | B |
| | 6 | 90 | 25.98 | 20 | 0.77 | 2 | 2 | 1 | 163.7 | 128.3 | 0.784 | B |

TABLE 2

| | | M (mm) | M/M0 | M/L | M × tb |
|---|---|---|---|---|---|
| Example | 1 | 12.84 | 0.99 | 0.49 | 19.25 |
| | 2 | 12.53 | 0.96 | 0.48 | 18.79 |
| | 3 | 12.22 | 0.94 | 0.47 | 18.33 |
| | 4 | 11.44 | 0.88 | 0.44 | 17.16 |
| | 5 | 10.67 | 0.82 | 0.41 | 16.01 |
| | 6 | 9.9 | 0.76 | 0.38 | 14.84 |
| | 7 | 9.9 | 0.76 | 0.38 | 6.93 |
| | 8 | 9.9 | 0.76 | 0.38 | 9.9 |
| | 9 | 9.9 | 0.76 | 0.38 | 12.37 |
| Comparative Example | 1 | 12.99 | 1.00 | 0.50 | 19.49 |
| | 2 | 8.35 | 0.64 | 0.32 | 12.52 |
| | 3 | 9.9 | 0.76 | 0.38 | 2.97 |
| | 4 | 9.9 | 0.76 | 0.38 | 4.95 |
| | 5 | 9.9 | 0.76 | 0.38 | 17.32 |
| | 6 | 9.9 | 0.76 | 0.38 | 19.79 |

The state "A" is, as shown by the dotted lines in FIG. 3A, a buckling deformed state in which the adjacent half-side portions 2a and 2b sandwiching the vertex P3 were deformed concavely and convexly in different directions in the radial direction, with the positions corresponding to the rib connection points P2 and P3 of the outer peripheral wall 1 as a node respectively and the intermediate point of each half-side portion 2a and 2b as an anti-node, and in which the concavely deformed portion and the convexly deformed portion were arranged in the circumferential direction alternately. In this state "A," each half-side portion 2a and 2b individually functions as a buckling deformation portion.

The state "B", as shown by the dotted lines of FIG. 3B, is a buckling deformed state in which two adjacent half-side portions 2a and 2b sandwiching the vertex P3 were deformed convexly or concavely in the same direction in the radial direction, with portions corresponding to the rib connection points P2 as a node and two adjacent half-side portions 2a and 2b sandwiching the vertex P3 as an anti-node. In this state "B," the two adjacent half-side portions 2a and 2b sandwiching the vertex P3 functions as one of bending deformation portions.

Table 1 also shows the results of the deformed state at the time of the buckling deformation.

FIG. 7A shows a cross-sectional view in which a deformed state at the time of an amount of displacement of 100 mm in a sample model of Example 3 is shown by dotted lines, and FIG. 7B shows a perspective view of its deformed state.

Figure 9A:
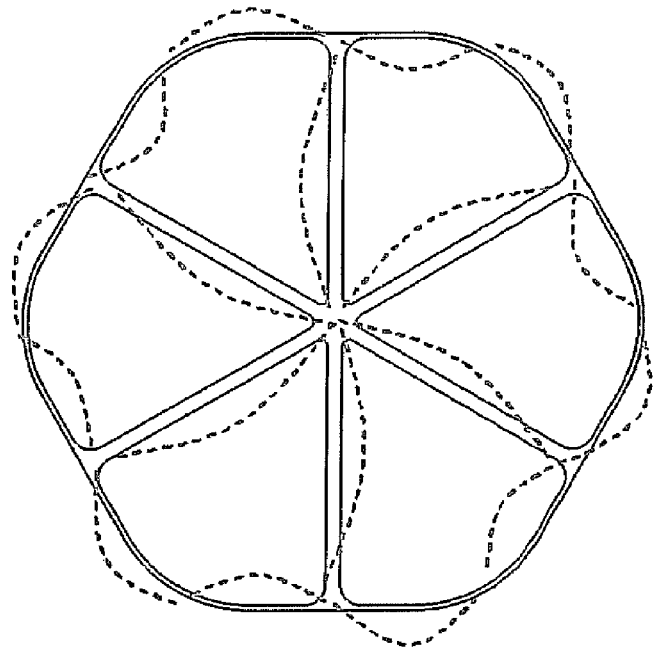
FIG. 9A is a cross-sectional view showing a sample model of Example 7.
Figure 9B:
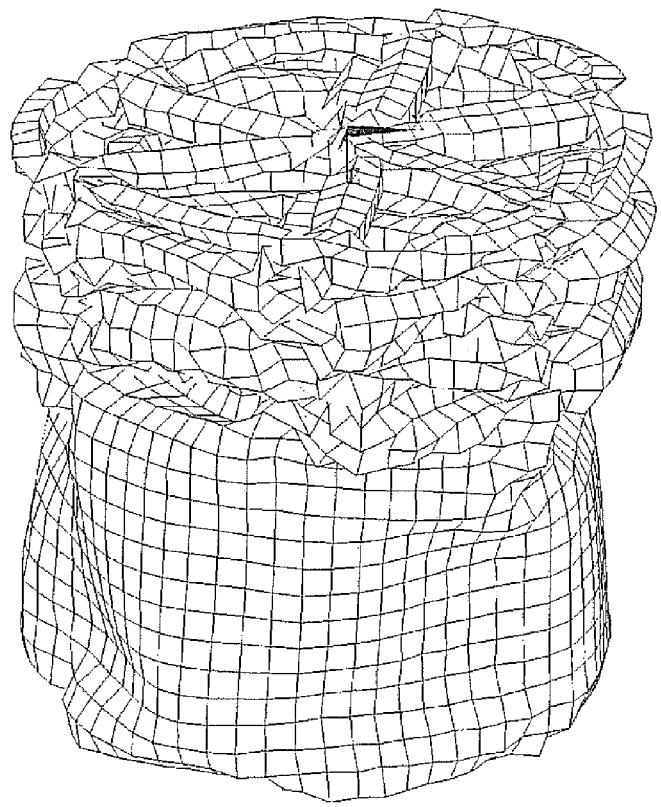
FIG. 9B is a perspective view showing a deformed state of the sample model of FIG. 9A.
Figure 10A:
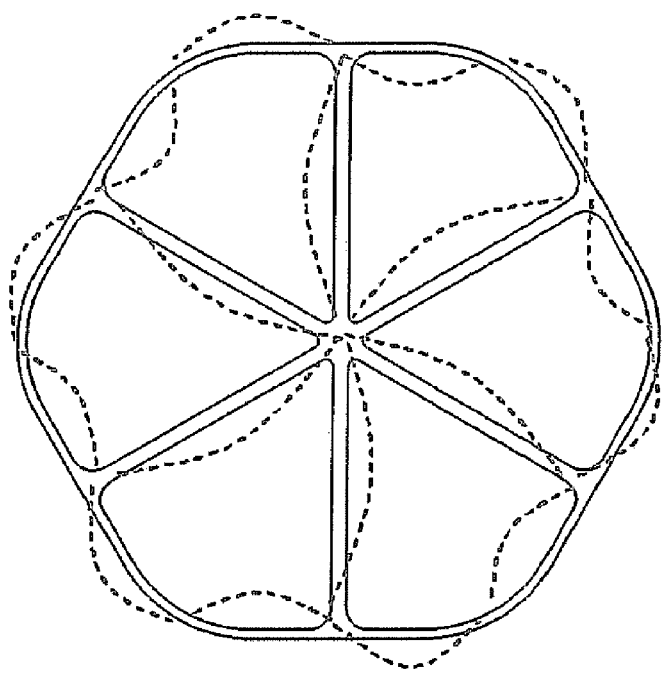
FIG. 10A is a cross-sectional view showing a sample model of Example 9.
Figure 10B:
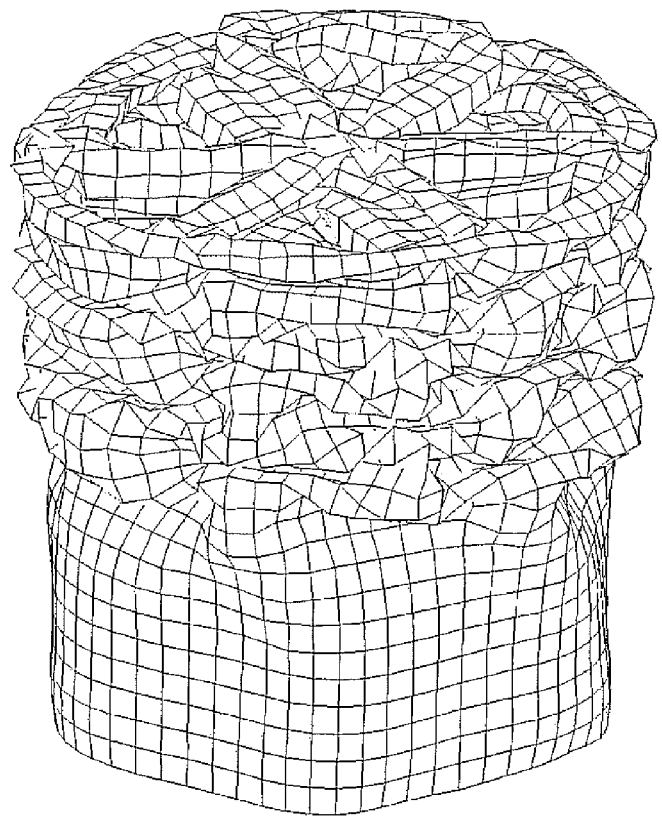
FIG. 10B is a perspective view showing a deformed state of the sample model of FIG. 10A.

Similarly, FIGS. 8A and 8B show a cross-sectional view and a perspective view of a sample model of Example 6. FIGS. 9A and 9B show a cross-sectional view and a perspective view of a sample model of Example 7. FIGS. 10A and 10B show a cross-sectional view and a perspective view of a sample model of Example 9. To facilitate understanding of the present invention, FIG. 3A and FIG. 8A are depicted using the same figure.

Figure 12A:
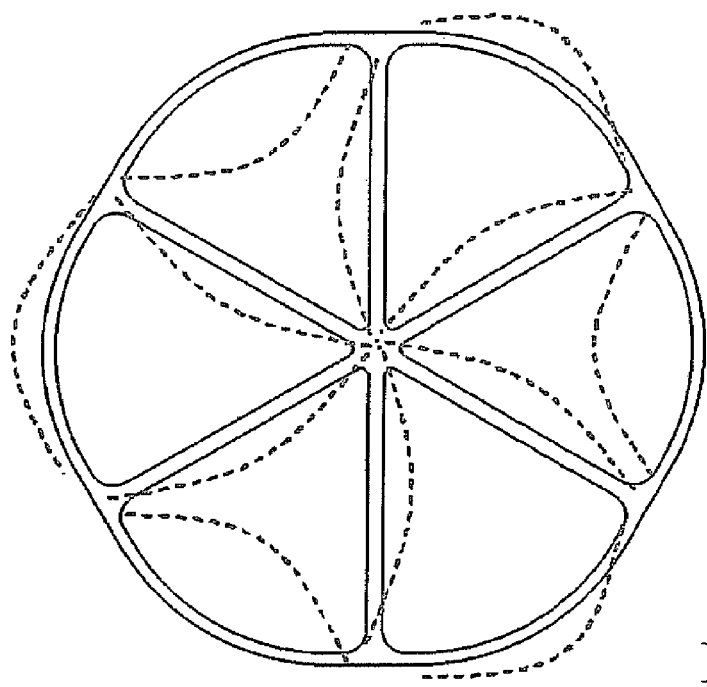
FIG. 12A is a cross-sectional view showing a sample model of Comparative Example 2.
Figure 12B:
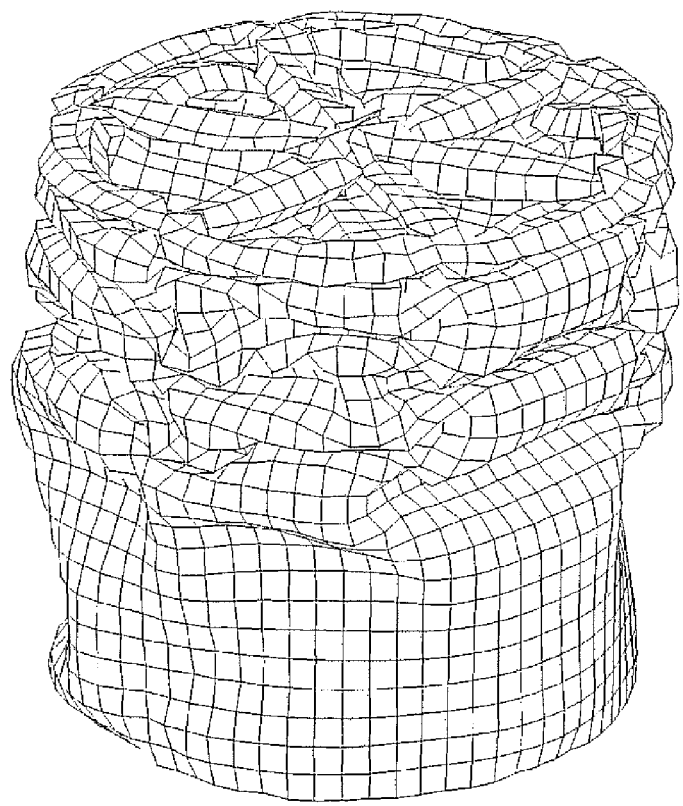
FIG. 12B is a perspective view showing a deformed state of the sample model of FIG. 12A.
Figure 13A:
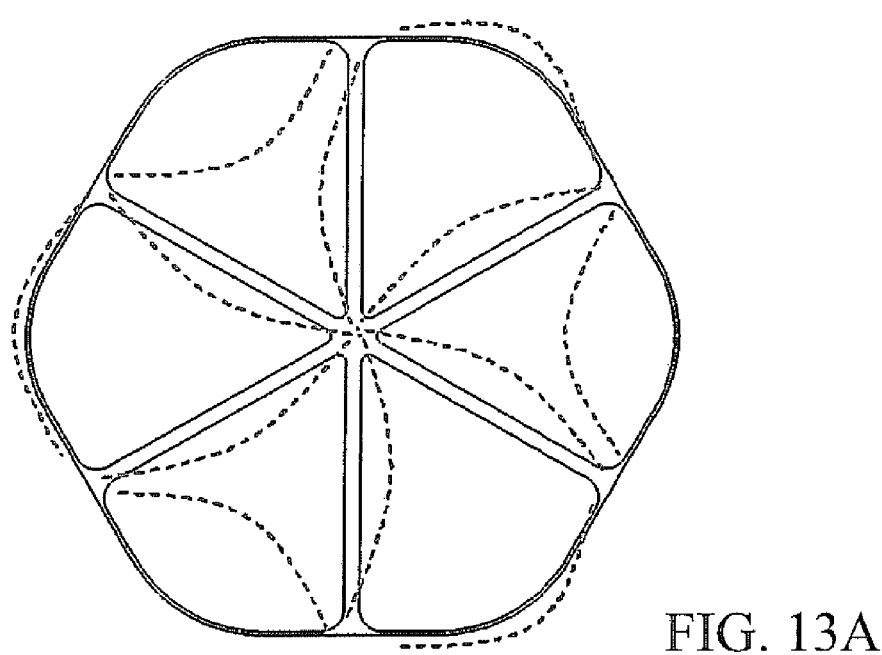
FIG. 13A is a cross-sectional view showing a sample model of Comparative Example 4.
Figure 13B:
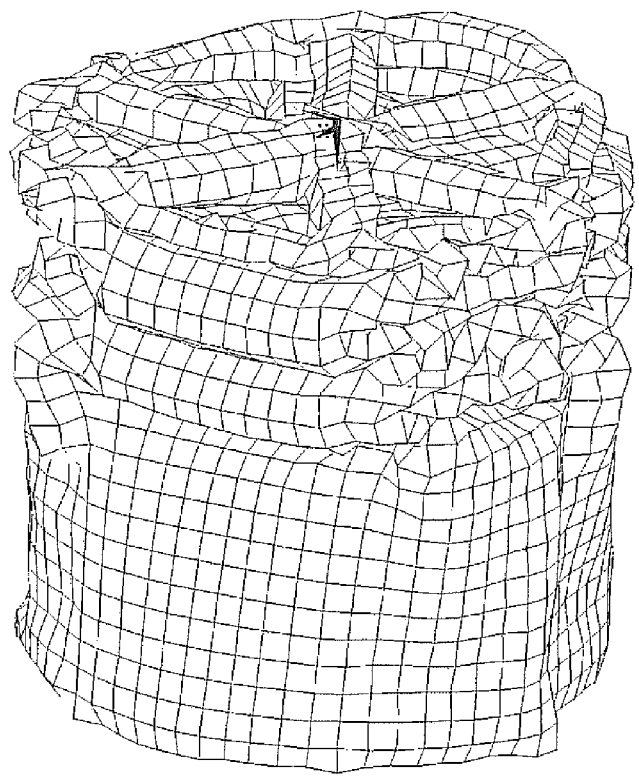
FIG. 13B is a perspective view showing a deformed state of the sample model of FIG. 13A.
Figure 14A:
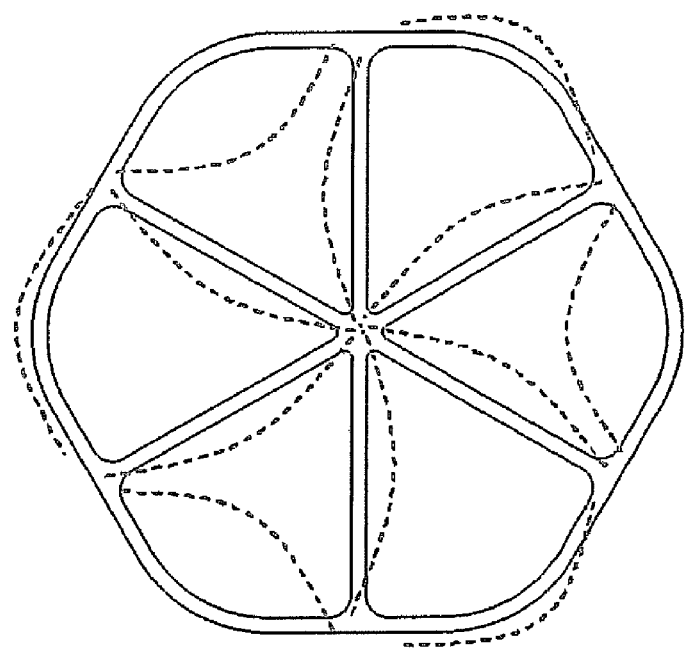
FIG. 14A is a cross-sectional view showing a sample model of Comparative Example 6.
Figure 14B:
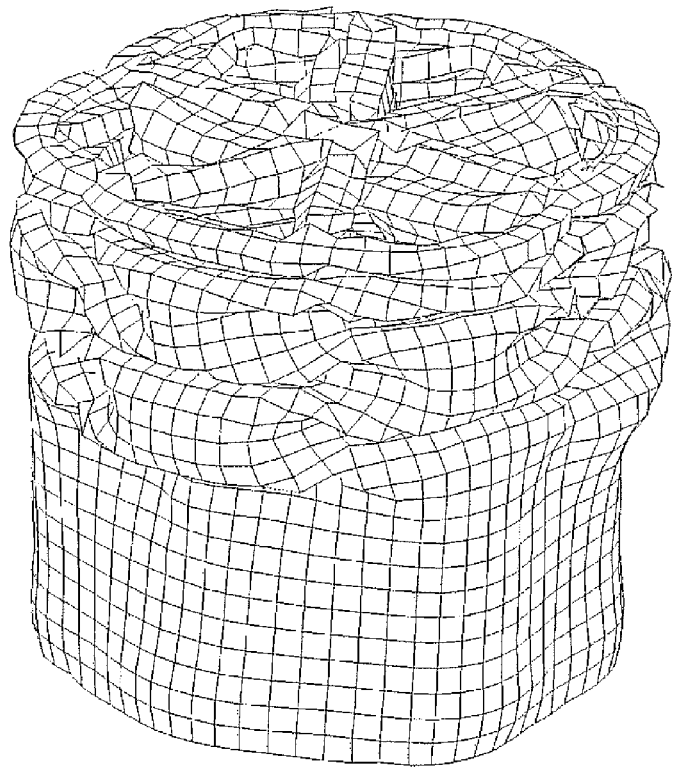
FIG. 14B is a perspective view showing a deformed state of the sample model of FIG. 14A.

FIGS. 11A and 11B show a cross-sectional view and a perspective view of a sample model of Comparative Example 1, respectively. FIGS. 12A and 12B show a cross-sectional view and a perspective view of a sample model of Comparative Example 2. FIGS. 13A and 13B show a cross-sectional view and a perspective view of a sample model of Comparative Example 4. FIGS. 14A and 14B show a cross-sectional view and a perspective view of a sample model of Comparative Example 6. To facilitate understanding of the present invention, FIG. 3B and FIG. 11A are depicted using the same figure.

<Evaluation>

As apparent from Table 1, etc., in the sample model of each Example, the deformed state at the time of buckling deformation was all in the state of "A." Further, in the sample model of each Example, the ratio of the average load to the maximum load was large and the average load was relatively large, which is considered to be excellent in impact absorbing characteristics.

Further, as apparent from Table 2, all of the sample models of Examples met the relation of $M/M0=0.75-0.99$, the relation of $0.35 \le M/L<0.5$, and the relation of $5.0<M \times tb$.

On the other hand, in the sample models of Comparative Examples, the deformed state at the time of buckling distortion was all in the state of "B." Further, in the sample models of Comparative Examples 1-3, 5, and 6, the ratio of the average load to the maximum load was smaller than that of Examples, which was considered to be poor in impact absorbing characteristics. In Comparative Example 4, the average load/maximum load was relatively large, but the average load was small. Therefore, it is difficult to sufficiently absorb impact energy, which is considered to be poor in impact absorbing characteristics.

In the sample model of Comparative Example 1, $M/M0=1.00$, which failed to meet the relation of $M/M0=0.75-0.99$. Further, in the sample model of Comparative Example 2, M/L was 0.32, which failed to meet the relation of $0.35 \le M/L<0.5$. Further, in the sample model of Comparative Examples 3 and 4, M×tb was 2.97, and 4.95, respectively, which failed to meet the relation of $5.0<M \times tb$.

Figure 15:
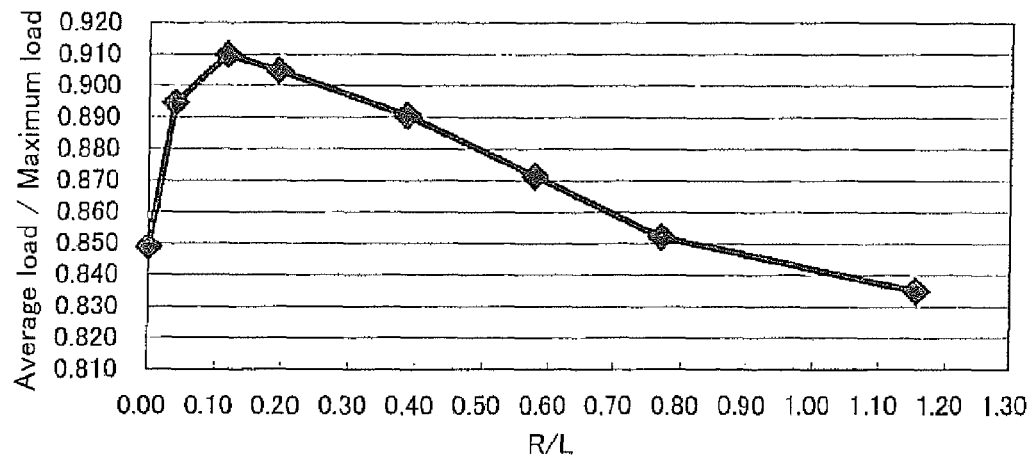
FIG. 15 is a graph showing the relation between [Curvature radius R/Half-side portion length R] and [Average load/Maximum load] created based on analysis results of Examples.

FIG. 15 is a graph showing the relation of the ratio (R/L) of the curvature radius R of the vertex arc portion 3 to the half-side portion length L and the ratio of the average load to the maximum load (average load/maximum load) created based on the analysis results of Examples and Comparative Examples. As apparent from this graph, when the R/L exceeds 0 but less than 1.15, especially 0.77 or less (Example 6), the average load/maximum load is 0.85 or more, which is excellent in impact absorbing characteristics. Especially, when the R/L is 0.05 or more, but not larger than 0.25, the average load/maximum load is especially large, which is especially excellent in impact absorbing characteristics.

Figure 16:
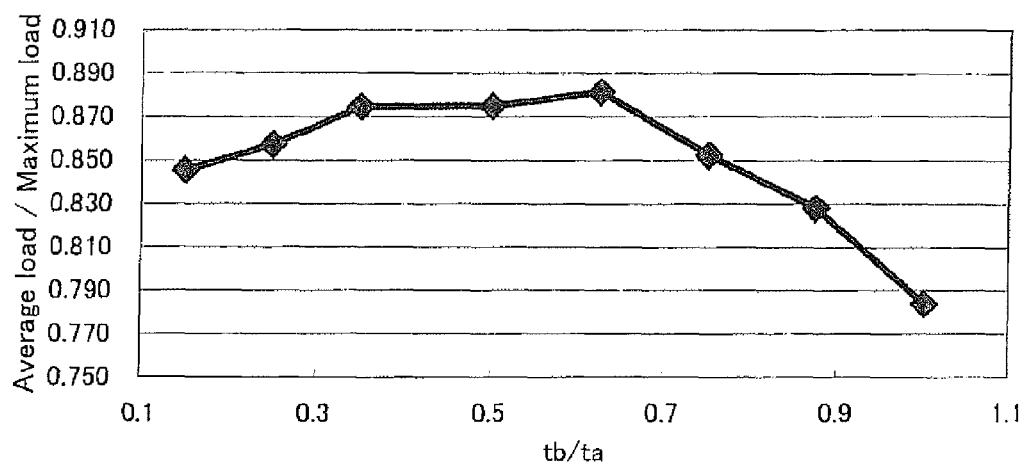
FIG. 16 is a graph showing the relation between [Outer peripheral wall thickness tb/Rib thickness ta] and [Average load/Maximum load] created based on analysis results of Examples.

FIG. 16 is a graph showing the relation of the ratio of the outer peripheral wall thickness tb to the rib thickness to and the average load/maximum load in Examples and Comparative Examples. As apparent from this graph, when the tb/ta exceeds 0.25 (corresponding to Comparative Example 4) but less than 0.875 (corresponding to Comparative Example 5), the average load/maximum load is large and the impact absorbing characteristics is excellent.

This application claims priority to Japanese Patent Application No. 2011-178432 filed on Aug. 17, 2011, the entire disclosure of which is incorporated herein by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The shock absorbing member according to the present invention is applicable to a crash box for a vehicle bumper beam, etc.

BRIEF EXPLANATION OF REFERENCE NUMERALS 1 outer peripheral wall
2 side portion 2a, 2b half-side portion
3 vertex arc portion
5, 622 rib
10, 61 bumper reinforcement
30, 62 crash box
ta rib thickness
tb outer peripheral wall thickness
C virtual vertex
L half-side portion length
P2 rib connection point
P3 vertex
R curvature radius of vertex arc portion

The invention claimed is:

1. A shock absorbing member configured to absorb impact energy by being compressively deformed in an axial direction, comprising:
   an outer peripheral wall having a polygonal shape in cross-section perpendicular to the axial direction and including a plurality of side portions; and
   a plurality of ribs, on an inner side of the outer peripheral wall, radially extending from a central axis and connected to an intermediate position of each of the side portions,
   wherein a boundary position of adjacent side portions on an outer peripheral surface of the outer peripheral wall is defined as a vertex, an intermediate position of each side portion on the outer peripheral surface of the outer peripheral wall is defined as a rib connection point, and portions segmenting each of the side portion into two, with the rib connection point as a boundary, are each defined as a half-side portion,
   wherein, when being compressively deformed in the axial direction, the two adjacent half-side portions sandwiching the vertex buckling-deform repeatedly in the axial direction while being deformed convexly and concavely in different directions in a radial direction, with positions of the outer peripheral wall corresponding to the rib connection point and the vertex respectively as a node and an intermediate portion of each half-side portion as an anti-node,
   wherein the vertex of the outer peripheral wall and vicinity thereof are constituted as an arc-shaped vertex arc portion having a curvature radius, and
   wherein it is adjusted so as to satisfy a relation of $0<R/L\leq1.15$, where an intersection point of virtual extended lines of both outer peripheral surface linear portions of the two adjacent half-side portions sandwiching the vertex is defined as a virtual vertex, a length from the virtual vertex to the rib connection point close to the virtual vertex is defined as a half-side portion length, the side portion length is "L," and a curvature radius of the outer peripheral surface of the vertex arc portion is "R".

2. The shock absorbing member as recited in claim 1, wherein, when being buckling-deformed, in a cross-section perpendicular to the axial direction, a half-side portion deformed convexly in a radially outward direction and a half-side portion deformed concavely in a radially inward direction are arranged alternately along a circumferential direction.

3. The shock absorbing member as recited in claim 1, wherein it is adjusted so as to satisfy a relation of M/M0=0.75 to 0.99,
   where a distance from the virtual vertex to a center of the shock absorbing material is "M0," and a shortest distance from the vertex to a virtual straight line connecting two rib connection points located on both sides of the vertex is "M".

4. The shock absorbing member as recited in claim 1, wherein it is adjusted so as to satisfy a relation of $0.35\leq M/L<0.5$,
   where a shortest distance from the vertex to a virtual straight line connecting two rib connection points located on both sides of the vertex is "M".

5. The shock absorbing member configured to absorb impact energy by being compressively deformed in axial direction, comprising:
   an outer peripheral wall having a polygonal shape in cross-section perpendicular to the axial direction and including a plurality of side porions; and
   a plurality of ribs, on an inner side of the outer peripheral wall, radially extending from a central axis and connected to an intermediate postion of each of the side portion,
   wherein a boundary postion of adjacent side portions on an outer peripheral surface of the outer peripheral wall is defined as a vertex, an intermediate postion of each side portion on the outer peripheral surface of the outer peripheral wall is defined as a rib connection point, and portions segmenting each of the side porion into two, with the rib connectionpoint as a boundary, are each defined as half-side portion,
   wherein, when being compressively deformed in the axil direction, the two adjacent half-side portions sandwiching the vertex buckling-deform repeatedly in the axial direction while being deformed convexly and concavely in different directions in a radial direction, with postions of the outer peripheral wall corresponding to the rib connection point and vertex respectively as node and an intermediate portion of eash half-side porion as an anti-node,
   wherein it is adjusted so as to satisfy a relation of $5.0<M\times tb$, and
   where "M" is a shortest distance from the vertex to a virtual linear line connecting two rib connection points arranged on both sides of the vertex, and "tb" is a thickness of the outer peripheral wall.

6. The shock absorbing member as recited in claim 1, wherein a thickness of the outer peripheral wall is formed to have a thickness thinner than a thickness of the rib.

7. The shock absorbing member as recited in claim 6, wherein it is adjusted so as to satisfy a relation of $0.25<tb/ta<0.875$, where "ta" is a thickness of the rib, and "tb" is a thickness of the outer peripheral wall.

8. The shock absorbing member as recited in claim 1, wherein the outer peripheral wall is formed into a regular hexagonal shape in cross-section having six side portions.

9. The shock absorbing member as recited in claim 1, wherein the shock absorbing member is constituted by an aluminum or its alloy extruded member or drawn member.

10. A vehicle crash box for supporting a bumper reinforcement to a vehicle structure, wherein the vehicle crash box is constituted by the shock absorbing member as recited in claim 1 and configured to absorb impact energy to be applied to the bumper reinforcement.

11. A bumper beam comprising:
    a bumper reinforcement to be arranged in a vehicle width direction; and
    a crash box configured to support the bumper reinforcement to a vehicle structure, wherein the crash box is constituted by the shock absorbing member as recited in claim 1 and configured to absorb impact energy to be applied to the bumper reinforcement by the crash box.

\* \* \* \* \*